(12) United States Patent
Papasakellariou et al.

(10) Patent No.: US 10,812,225 B2
(45) Date of Patent: Oct. 20, 2020

(54) COMMUNICATION ON LICENSED AND UNLICENSED BANDS

(71) Applicant: Samsung Electronics Co., Ltd., Suwon-si, Gyeonggi-do (KR)

(72) Inventors: Aris Papasakellariou, Houston, TX (US); Jianzhong Zhang, Plano, TX (US); Boon Loong Ng, Plano, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/056,216

(22) Filed: Aug. 6, 2018

(65) Prior Publication Data

US 2018/0351704 A1  Dec. 6, 2018

Related U.S. Application Data

(62) Division of application No. 14/826,813, filed on Aug. 14, 2015, now abandoned.

(Continued)

(51) Int. Cl.
*H04W 72/04* (2009.01)
*H04W 52/14* (2009.01)
(Continued)

(52) U.S. Cl.
CPC .......... *H04L 1/1812* (2013.01); *H04L 1/1822* (2013.01); *H04L 1/1887* (2013.01);
(Continued)

(58) Field of Classification Search
CPC . H04W 52/146; H04W 52/34; H04W 52/346; H04W 52/50; H04W 52/281;
(Continued)

(56) References Cited

U.S. PATENT DOCUMENTS

| 8,767,585 B2* | 7/2014 | Pelletier | H04W 74/002 370/254 |
| 2010/0238825 A1* | 9/2010 | Zhang | H04W 52/286 370/252 |

(Continued)

FOREIGN PATENT DOCUMENTS

| CN | 101754404 A | 6/2010 |
| CN | 102202028 A | 9/2011 |

(Continued)

OTHER PUBLICATIONS

"Sounding Reference Signal Assignments in E-UTRA Uplink," 3GPP TSG RAN WG1 #49bis, Texas Instruments, R1-072849, Orlando, Florida, USA, Jun. 25-29, 2007, 7 pages.

(Continued)

*Primary Examiner* — Sai Aung

(57) ABSTRACT

To perform a random access procedure on licensed and unlicensed carriers, a user equipment may receive a system information block (SIB) on a downlink carrier in a first carrier frequency, where the SIB includes configuration information for a first uplink carrier and a second uplink carrier, and transmit a physical random access channel (PRACH) either on the first uplink carrier or on the second uplink carrier. A response to the transmitted PRACH received by the user equipment on a downlink carrier may schedule transmission of data channel. The SIB preferably includes configuration information for determining a power for the PRACH transmission on the first and second uplink carriers. The frequency band of the downlink carrier is same as the frequency band of the first uplink carrier and is different than that of the second uplink carrier, which has a frequency lower than the frequency of the first UL carrier.

17 Claims, 15 Drawing Sheets

Related U.S. Application Data

(60) Provisional application No. 62/038,673, filed on Aug. 18, 2014.

(51) Int. Cl.

| | |
|---|---|
| *H04J 11/00* | (2006.01) |
| *H04L 1/18* | (2006.01) |
| *H04W 16/14* | (2009.01) |
| *H04W 74/08* | (2009.01) |
| *H04W 52/02* | (2009.01) |
| *H04L 5/00* | (2006.01) |
| *H04W 28/26* | (2009.01) |
| *H04W 28/06* | (2009.01) |

(52) U.S. Cl.
CPC .......... *H04L 1/1896* (2013.01); *H04L 5/0048* (2013.01); *H04L 5/0053* (2013.01); *H04W 16/14* (2013.01); *H04W 52/0225* (2013.01); *H04W 52/0251* (2013.01); *H04W 74/0808* (2013.01); *H04L 5/001* (2013.01); *H04L 5/006* (2013.01); *H04W 28/06* (2013.01); *H04W 28/26* (2013.01); *H04W 72/04* (2013.01); *H04W 74/0833* (2013.01); *Y02D 30/70* (2020.08)

(58) Field of Classification Search
CPC .......... H04W 74/0833; H04W 52/325; H04W 52/367; H04W 74/004; H04W 48/08; H04W 52/16; H04W 52/245; H04W 52/246; H04W 52/248; H04W 52/286; H04W 52/327
See application file for complete search history.

(56) References Cited

U.S. PATENT DOCUMENTS

| | | | | |
|---|---|---|---|---|
| 2010/0296467 | A1* | 11/2010 | Pelletier | H04W 74/002 |
| | | | | 370/329 |
| 2011/0249581 | A1 | 10/2011 | Jen | |
| 2011/0269406 | A1* | 11/2011 | Aminaka | H04W 24/10 |
| | | | | 455/67.11 |
| 2012/0127931 | A1* | 5/2012 | Gaal | H04L 1/1861 |
| | | | | 370/329 |
| 2012/0188897 | A1* | 7/2012 | Shen | H04W 52/146 |
| | | | | 370/252 |
| 2012/0213151 | A1 | 8/2012 | Zhao et al. | |
| 2012/0263117 | A1* | 10/2012 | Love | H04L 5/003 |
| | | | | 370/329 |
| 2012/0281563 | A1* | 11/2012 | Comsa | H04W 24/10 |
| | | | | 370/252 |
| 2013/0058315 | A1* | 3/2013 | Feuersanger | H04W 52/327 |
| | | | | 370/336 |
| 2013/0121216 | A1 | 5/2013 | Chen et al. | |
| 2013/0322343 | A1 | 12/2013 | Seo et al. | |
| 2013/0329711 | A1 | 12/2013 | Seo et al. | |
| 2013/0336156 | A1 | 12/2013 | Wei et al. | |
| 2014/0105152 | A1 | 4/2014 | Wu et al. | |
| 2014/0105189 | A1 | 4/2014 | Papasakellariou et al. | |
| 2015/0016282 | A1* | 1/2015 | Su | H04W 36/0085 |
| | | | | 370/252 |
| 2015/0049712 | A1* | 2/2015 | Chen | H04W 72/1215 |
| | | | | 370/329 |
| 2015/0049714 | A1 | 2/2015 | Ghai | |
| 2015/0063245 | A1* | 3/2015 | Gao | H04W 52/346 |
| | | | | 370/329 |
| 2015/0304925 | A1* | 10/2015 | Hwang | H04L 5/00 |
| | | | | 370/331 |
| 2016/0205632 | A1* | 7/2016 | Yi | H04W 72/10 |
| | | | | 455/522 |
| 2016/0359593 | A1* | 12/2016 | Dai | H04L 27/0006 |

FOREIGN PATENT DOCUMENTS

| | | |
|---|---|---|
| EP | 2634939 A2 | 9/2013 |
| WO | 2013185835 A1 | 12/2013 |
| WO | 2014078676 A2 | 5/2014 |

OTHER PUBLICATIONS

Foreign Communication From a Related Counterpart Application, European Application No. 158343723, Partial Supplementary European Search Report dated Mar. 2, 2018, 11 pages.

Foreign Communication From a Related Counterpart Application, PCT Application No. PCT/KR2015/008616, International Search Report dated Dec. 30, 2015, 3 pages.

European Patent Office, "European Search Report," Application No. EP19150733.4, dated Mar. 29, 2019, 7 pages.

LG Electronics, "Remaining CA Issues for Cell Activation/Deactivation and CIF," R1-106107, 3GPP TSG RAN WG1 Meeting #63, Jacksonville, USA, Nov. 15-19, 2010, 2 pages.

China National Intellectual Property Administration, First Office Action regarding Application No. 201580044718.3, dated Aug. 5, 2020, 12 pages.

\* cited by examiner

- ■ Comb with SRS
- □ Comb without SRS

COMMUNICATION ON LICENSED AND UNLICENSED BANDS

CROSS-REFERENCE TO RELATED APPLICATION AND CLAIM OF PRIORITY

This application is a division of U.S. Non-Provisional patent application Ser. No. 14/826,813 filed Aug. 14, 2015 and entitled COMMUNICATION ON LICENSED AND UNLICENSED BANDS, and claims priority to U.S. Provisional Patent Application No. 62/038,673 filed Aug. 16, 2014 and entitled "UPLINK COMMUNICATIONS IN UNLICENSED BANDS." The content of the above-identified patent document are incorporated herein by reference.

TECHNICAL FIELD

The present application relates generally to wireless communications and, more specifically, to communication on licensed carriers and on unlicensed carriers.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

SUMMARY

This disclosure provides methods and apparatus to support communication on licensed carriers and on unlicensed carriers.

In a first embodiment, a method includes performing, by a user equipment (UE), sensing on a carrier to determine availability of the carrier for the UE to transmit. The method also includes transmitting, by the UE, a reference signal (RS) when the UE determines the carrier to be available based on the sensing. The RS transmission is within a first subframe (SF) and over a period that starts from the time the UE determines the carrier to be available and transmits the RS until the end of the first SF. The method additionally includes transmitting, by the UE, data information in a SF after the first SF.

In a second embodiment, a method includes generating by a User Equipment (UE) a first data transport block (TB) for transmission in a first subframe (SF) and a second data TB for transmission in a second SF. The method also includes performing, by the UE, sensing on a carrier to determine availability of the carrier for the UE to transmit in the first SF or in the second SF. The method additionally includes determining, by the UE, unavailability of the carrier for the UE to transmit in the first SF and availability of the carrier for the UE to transmit in the second SF. The method further includes transmitting, by the UE, the first data TB in a first bandwidth of the carrier in the second SF and the second data TB in a second bandwidth of the carrier in the second SF. The first bandwidth and the second bandwidth are not overlapping.

In a third embodiment, a method includes performing, by a base station, sensing on a carrier to determine availability of the carrier for the base station to receive in a subframe (SF). The method also includes receiving, by the base station, a repetition of a channel transmission in the SF when the base station determines the carrier to be available based on the sensing. The method additionally includes suspending, by the base station, a reception of the repetition of the channel transmission in the SF when the base station determines the carrier to not be available based on the sensing;

In a fourth embodiment, a User Equipment (UE) includes an energy detector configured to perform sensing on a carrier to determine availability of the carrier for the UE to transmit. The UE also includes a transmitter configured to transmit a reference signal (RS) when the UE determines the carrier to be available based on the sensing. The RS transmission is within a first subframe (SF) and over a period that starts from the time the first UE determines the carrier to be available and transmits the RS until the end of the first SF. The transmitter is also configured to transmit data information in a SF after the first SF.

In a fifth embodiment, a User Equipment (UE) includes a processor configured to generate a first data transport block (TB) for transmission in a first subframe (SF) and a second data TB for transmission in a second SF. The UE also includes an energy detector configured to perform sensing on a carrier in the first SF and in the second SF. The UE additionally includes a controller configured to process the result of the energy detector. The controller determines unavailability of the carrier for the UE to transmit in the first SF and availability of the carrier for the UE to transmit in the second SF. The UE further includes a transmitter configured to transmit the first data TB in a first bandwidth of the carrier in the second SF and the second data TB in a second bandwidth of the carrier in the second SF. The first bandwidth and the second bandwidth are not overlapping.

In a sixth embodiment, a base station includes an energy detector configured to perform sensing on a carrier to determine availability of the carrier for the base station to receive in a subframe (SF). The base station also includes a receiver configured to receive a repetition of a channel transmission in the SF when the base station determines the carrier to be available based on the sensing and to suspend reception of the repetition of the channel transmission in the SF when the base station determines the carrier to not be available based on the sensing.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many if not most instances such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 25, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated into the present disclosure as if fully set forth herein: 3GPP TS 36.211 v12.2.0, "E-UTRA, Physical channels and modulation" (REF 1); 3GPP TS 36.212 v12.2.0, "E-UTRA, Multiplexing and Channel coding" (REF 2); 3GPP TS 36.213 v12.2.0, "E-UTRA, Physical Layer Procedures" (REF 3); 3GPP TS 36.321 v12.2.0, "E-UTRA, Medium Access Control (MAC) protocol specification" (REF 4); 3GPP TS 36.331 v12.2.0, "E-UTRA, Radio Resource Control (RRC) Protocol Specification" (REF 5); 3GPP TS 36.301 v12.2.0, "Evolved Universal Terrestrial Radio Access (E-UTRA); User Equipment (UE) radio transmission and reception" (REF 6); and IEEE, "Part 11: Wireless LAN Medium Access Control (MAC) and Physical Layer (PHY) Specifications", http://standards.ieee-.org/getieee802/802.11.html (REF 7).

This disclosure relates to communication on licensed carriers (bands) and on unlicensed carriers (bands). A wireless communication network includes a DownLink (DL) that conveys signals from transmission points, such as base stations or enhanced eNBs (eNBs), to UEs. The wireless communication network also includes an UpLink (UL) that conveys signals from UEs to reception points, such as eNBs.

Figure 1:
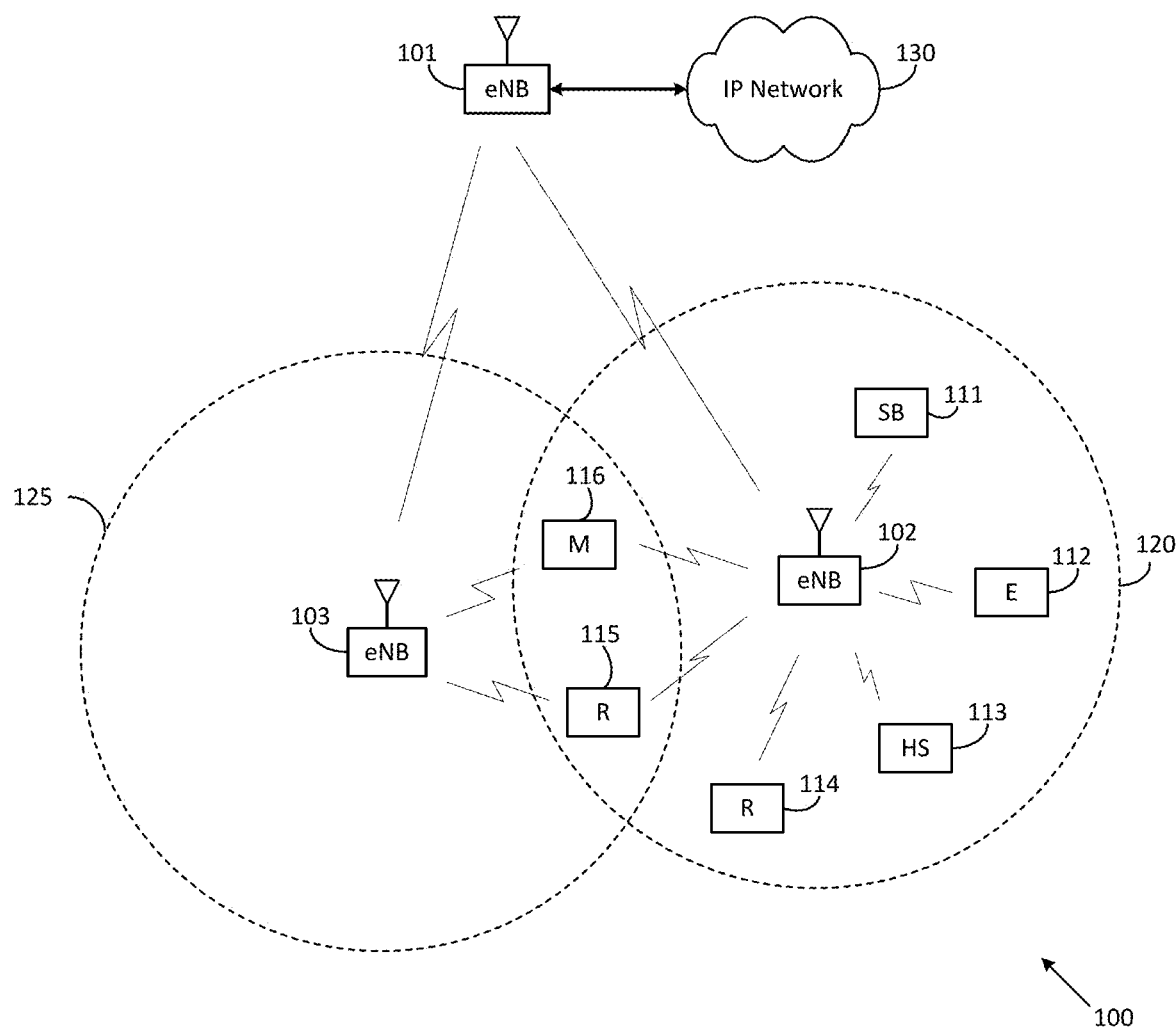
FIG. 1 illustrates an example wireless communication network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eeNB" or "eNB," such as "base station" or "access point." For the sake of convenience, the terms "eeNB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." A UE, may be fixed or mobile and may be a cellular phone, a personal computer device, and the like. For the sake of convenience, the terms "user equipment" and "UE" are used in this patent document to refer to remote wireless equipment that wirelessly accesses an eNB, whether the UE is a mobile device (such as a mobile telephone or smart-phone) or is normally considered a stationary device (such as a desktop computer or vending machine).

The eNB 102 provides wireless broadband access to the network 130 for a first plurality of UEs within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, various components of the network 100 (such as the eNBs 101-103 and/or the UEs 111-116) support the adaptation of communication direction in the network 100, and can provide communication on licensed carriers and on unlicensed carriers.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2:
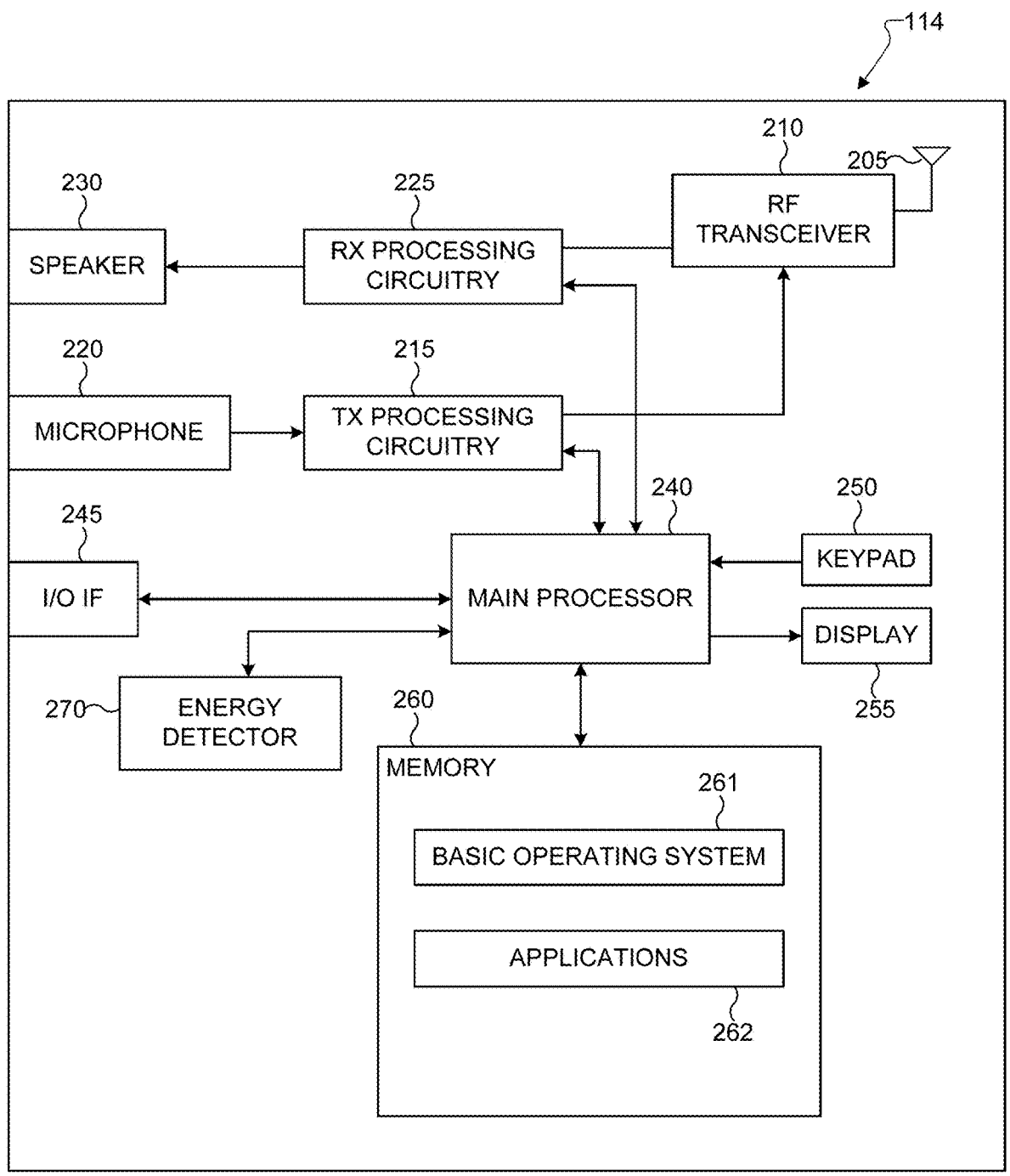
FIG. 2 illustrates an example user equipment (UE) according to this disclosure.

FIG. 2 illustrates an example UE 114 according to this disclosure. The embodiment of the UE 114 shown in FIG. 2 is for illustration only, and the other UEs in FIG. 1 could have the same or similar configuration. However, UEs come in a wide variety of configurations, and FIG. 2 does not limit the scope of this disclosure to any particular implementation of a UE.

As shown in FIG. 2, the UE 114 includes an antenna 205, a radio frequency (RF) transceiver 210, transmit (TX) processing circuitry 215, a microphone 220, and receive (RX) processing circuitry 225. The UE 114 also includes a speaker 230, a main processor 240, an input/output (I/O) interface (IF) 245, a keypad 250, a display 255, and a memory 260. The memory 260 includes a basic operating system (OS) program 261 and one or more applications 262. In certain embodiments, the UE 114 includes an energy detector 270.

The RF transceiver 210 receives, from the antenna 205, an incoming RF signal transmitted by an eNB or another UE. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the main processor 240 for further processing (such as for web browsing data).

The TX processing circuitry 215 receives analog or digital voice data from the microphone 220 or other outgoing baseband data (such as web data, e-mail, or interactive video game data) from the main processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The main processor 240 can include one or more processors or other processing devices and can execute the basic OS program 261 stored in the memory 260 in order to control the overall operation of the UE 114. For example, the main processor 240 could control the reception of forward channel signals and the transmission of reverse channel signals by the RF transceiver 210, the RX processing circuitry 225, and the TX processing circuitry 215 in accordance with well-known principles. In some embodiments, the main processor 240 includes at least one microprocessor or microcontroller.

The main processor 240 is also capable of executing other processes and programs resident in the memory 260, such as operations to support the adaptation of communication direction in the network 100, and for communication on licensed carriers and on unlicensed carriers. The main processor 240 can move data into or out of the memory 260 as required by an executing process. In some embodiments, the main processor 240 is configured to execute the applications 262 based on the OS program 261 or in response to signals received from eNBs, other UEs, or an operator. The main processor 240 is also coupled to the I/O interface 245, which provides the UE 114 with the ability to connect to other devices such as laptop computers and handheld computers. The I/O interface 245 is the communication path between these accessories and the main processor 240.

The main processor 240 is also coupled to the keypad 250 and the display unit 255. The operator of the UE 114 can use the keypad 250 to enter data into the UE 114. The display 255 may be a liquid crystal display or other display capable of rendering text and/or at least limited graphics, such as from web sites. The display 255 could also represent a touch-screen.

The memory 260 is coupled to the main processor 240. Part of the memory 260 could include a broadcast signaling memory (RAM), and another part of the memory 260 could include a Flash memory or other read-only memory (ROM).

As described in more detail below, the transmit and receive paths of the UE 114 (implemented using the RF transceiver 210, TX processing circuitry 215, and/or RX processing circuitry 225) support communication on licensed carriers and on unlicensed carriers.

The energy detector 270 can be processing circuitry including one or more sensors configured to detect a carrier to determine availability of the carrier for the base station to receive in a subframe (SF). In certain embodiments, at least a portion of the energy detector 270 is included in, or part of, the main processor 240.

Although FIG. 2 illustrates one example of UE 114, various changes may be made to FIG. 2. For example, various components in FIG. 2 could be combined, further subdivided, or omitted and additional components could be added according to particular needs. As a particular example, the main processor 240 could be divided into multiple processors, such as one or more central processing units (CPUs) and one or more graphics processing units (GPUs). Also, while FIG. 2 illustrates the UE 114 configured as a mobile telephone or smart-phone, UEs could be configured to operate as other types of mobile or stationary devices. In addition, various components in FIG. 2 could be replicated, such as when different RF components are used to communicate with the eNBs 101-103 and with other UEs.

Figure 3:
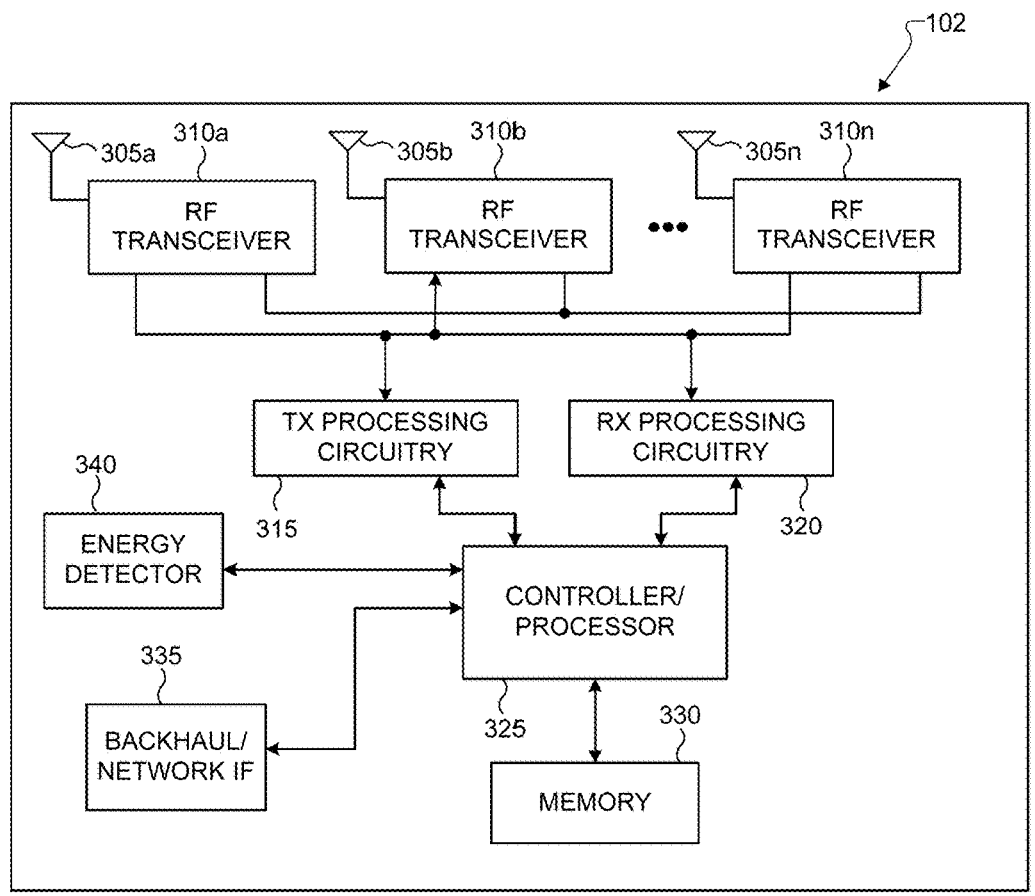
FIG. 3 illustrates an example enhanced eNB (eNB) according to this disclosure.

FIG. 3 illustrates an example eNB 102 according to this disclosure. The embodiment of the eNB 102 shown in FIG. 3 is for illustration only, and other eNBs of FIG. 1 could have the same or similar configuration. However, eNBs come in a wide variety of configurations, and FIG. 3 does not limit the scope of this disclosure to any particular implementation of an eNB.

As shown in FIG. 3, the eNB 102 includes multiple antennas 305a-305n, multiple RF transceivers 310a-310n, transmit (TX) processing circuitry 315, and receive (RX) processing circuitry 320. The eNB 102 also includes a controller/processor 325, a memory 330, and a backhaul or network interface 335. In certain embodiments, eNB 102 includes an energy detector 340 configured to perform sensing on a carrier to determine availability of the carrier for the base station to receive in a subframe (SF)

The RF transceivers 310a-310n receive, from the antennas 305a-305n, incoming RF signals, such as signals transmitted by UEs or other eNBs. The RF transceivers 310a-310n down-convert the incoming RF signals to generate IF or baseband signals. The IF or baseband signals are sent to the RX processing circuitry 320, which generates processed baseband signals by filtering, decoding, and/or digitizing the baseband or IF signals. The RX processing circuitry 320 transmits the processed baseband signals to the controller/processor 325 for further processing.

The TX processing circuitry 315 receives analog or digital data (such as voice data, web data, e-mail, or interactive video game data) from the controller/processor 325. The TX processing circuitry 315 encodes, multiplexes, and/or digitizes the outgoing baseband data to generate processed baseband or IF signals. The RF transceivers 310a-310n receive the outgoing processed baseband or IF signals from the TX processing circuitry 315 and up-converts the baseband or IF signals to RF signals that are transmitted via the antennas 305a-305n.

The controller/processor 325 can include one or more processors or other processing devices that control the overall operation of the eNB 102, such as operations to support the adaptation of communication direction in the network 100, and for communication on licensed carriers and on unlicensed carriers. For example, the controller/processor 325 could control the reception of forward channel signals and the transmission of reverse channel signals by the RF transceivers 310a-310n, the RX processing circuitry 320, and the TX processing circuitry 315 in accordance with well-known principles. The controller/processor 325 could support additional functions as well, such as more advanced wireless communication functions. For instance, the controller/processor 325 could support beam forming or directional routing operations in which outgoing signals from multiple antennas 305a-305n are weighted differently to effectively steer the outgoing signals in a desired direction. Any of a wide variety of other functions could be supported in the eNB 102 by the controller/processor 325. In some embodiments, the controller/processor 325 includes at least one microprocessor or microcontroller.

The controller/processor 325 is also capable of executing programs and other processes resident in the memory 330, such as a basic OS. The controller/processor 325 can move data into or out of the memory 330 as required by an executing process.

The controller/processor 325 is also coupled to the backhaul or network interface 335. The backhaul or network interface 335 allows the eNB 102 to communicate with other devices or systems over a backhaul connection or over a network. The interface 335 could support communications over any suitable wired or wireless connection(s). For example, when the eNB 102 is implemented as part of a cellular communication system (such as one supporting 5G, LTE, or LTE-A), the interface 335 could allow the eNB 102 to communicate with other eNBs over a wired or wireless backhaul connection. When the eNB 102 is implemented as an access point, the interface 335 could allow the eNB 102 to communicate over a wired or wireless local area network or over a wired or wireless connection to a larger network (such as the Internet). The interface 335 includes any suitable structure supporting communications over a wired or wireless connection, such as an Ethernet or RF transceiver.

The memory 330 is coupled to the controller/processor 325. Part of the memory 330 could include a RAM, and another part of the memory 330 could include a Flash memory or other ROM.

As described in more detail below, the transmit and receive paths of the eNB 102 (implemented using the RF transceivers 310a-310n, TX processing circuitry 315, and/or RX processing circuitry 320) support communication on licensed carriers and on unlicensed carriers.

The energy detector 340 can be processing circuitry including one or more sensors configured to detect a carrier to determine availability of the carrier for the base station to receive in a subframe (SF). In certain embodiments, at least a portion of the energy detector 270 is included in, or part of, the controller/processor 325.

Although FIG. 3 illustrates one example of an eNB 102, various changes may be made to FIG. 3. For example, the eNB 102 could include any number of each component shown in FIG. 3. As a particular example, an access point could include a number of interfaces 335, and the controller/processor 325 could support routing functions to route data between different network addresses. As another particular example, while shown as including a single instance of TX processing circuitry 315 and a single instance of RX processing circuitry 320, the eNB 102 could include multiple instances of each (such as one per RF transceiver).

Machine Type Communications (MTC) or Internet of Things (IoT) refers to communication of automated devices, or UEs, in a network. Compared to typical human communication, MTC typically has relaxed latency and Quality of Service (QoS) requirements and often does not require mobility support. However, MTC also requires that respective UEs have reduced cost and reduced power consumption compared to UEs serving human communications.

MTC UEs can be used for a wide variety of applications in different sectors including healthcare, such as monitors, industrial, such as safety and security, energy, such as meters and turbines, transport, such as fleet management and tolls, and consumer and home, such as appliances and power systems.

The requirements of reduced power consumption or reduced cost for MTC UEs that can be realized by limiting the power amplifier gain or reducing the number of receiver antennas can lead to reduced coverage for MTC UEs relative to other UEs. The coverage for MTC UEs can be further degraded by the location of MTC UEs that is often in basements of buildings or, in general, in locations where propagation of radio signals experiences substantial pathloss. For these reasons, supporting coverage enhancements is typically an essential feature for a network that can serve MTC UEs.

A number of Radio Access Technologies (RATs) exist for supporting MTC, including IEEE 802.11, IEEE 802.16, LTE, GSM, and others. MTC UEs can also communicate using peer-to-peer technologies such as BLUETOOTH®, ZIGBEE®, and/or other ad-hoc or mesh network technologies. Techniques described herein can be used for various wireless communications systems, such as cellular or local access networks, that can employ a variety of respective RATs. The disclosure considers the LTE or LTE-Advanced RATs developed under the 3rd Generation Partnership Project (3GPP).

In some wireless networks, DL signals include data signals that convey information content, control signals that convey DL control information (DCI), and reference signals (RS), which are also known as pilot signals. An eNB transmits data information or DCI through respective physical DL shared channels (PDSCHs) or physical DL control channels (PDCCHs). An eNB 102 transmits acknowledgement information, in response to transmission of a data transport block (TB) from a UE 114, in a physical hybrid ARQ indicator channel (PHICH). An eNB 102 transmits one or more of multiple types of RS including UE-common RS (CRS), channel state information RS (CSI-RS), and demodulation RS (DMRS). A CRS is transmitted over a DL system bandwidth and can be used by UEs to demodulate data or control signals or to perform measurements. To reduce CRS overhead, an eNB 102 can transmit a CSI-RS with a smaller density in the time and/or frequency domain than a CRS. For interference measurement reports (IMRs), a zero power CSI-RS (ZP CSI-RS) can be used. A UE 114 can determine CSI-RS transmission parameters through higher layer signaling from an eNB 102. DMRS is transmitted only in a bandwidth of a respective PDSCH or PDCCH transmission and a UE 114 can use the DMRS to demodulate information in the PDSCH or PDCCH.

DCI can serve several purposes. A DCI format includes information elements (IEs). A DCI format also includes cyclic redundancy check (CRC) bits in order for a UE 114 to confirm a correct DCI format detection. A DCI format type is identified by a radio network temporary identifier (RNTI) that scrambles the CRC bits and is configured to a UE 114 by an eNB 102. For a DCI format scheduling a PDSCH (DL DCI format) or a PUSCH (UL DCI format) to a single UE 114, the RNTI is a cell RNTI (C-RNTI). For a DCI format scheduling a PDSCH conveying system information (SI) to a group of UEs, the RNTI is a SI-RNTI. For a DCI format scheduling a PDSCH providing a response to random access (RA) preamble transmissions from one or more UEs, the RNTI is a RA-RNTI. For a DCI format scheduling a PDSCH paging one or more UEs, the RNTI is a P-RNTI. For a DCI format providing transmission power control (TPC) commands to a group of UEs, the RNTI is a TPC-RNTI. Each RNTI type is configured to UE 114 through higher layer signaling (the C-RNTI is unique to a UE). Additionally, semi-persistent scheduling (SPS) can be used for PDSCH transmissions to or PUSCH transmissions from UE 114 without eNB 102 transmitting an associated DCI format. With SPS, UE 114 is configured by eNB 102 through higher layer signaling frequency resources to periodically receive a PDSCH or transmit a PUSCH. PDCCH transmissions can be either time division multiplexed (TDM) or frequency division multiplexed (FDM) with PDSCH transmissions (see also REF 3). For brevity, the TDM case is subsequently referenced but the exact multiplexing method for PDSCH and PCCCH is not material to the purposes of the disclosure.

A transmission time interval is referred to as a subframe (SF). A unit of ten SFs is referred to as one frame. DL signaling is by orthogonal frequency division multiplexing (OFDM) while UL signaling is by DFT-spread-OFDM (DFT-S-OFDM).

Figure 4:
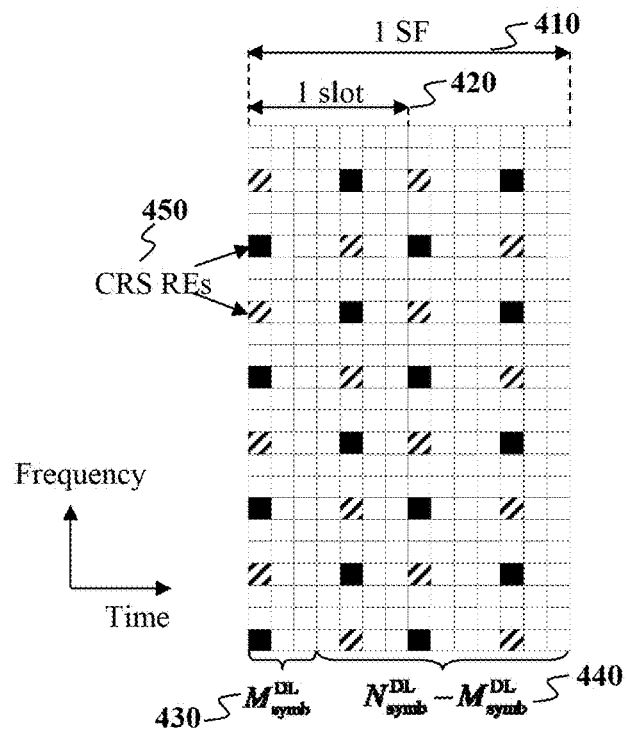
FIG. 4 illustrates an example DL SF structure according to this disclosure.

FIG. 4 illustrates an example DL SF structure according to this disclosure. The embodiment of the DL SF structure shown in FIG. 4 is for illustration only. Other embodiments could be used without departing from the scope of the present disclosure.

A DL SF 410 has duration of one millisecond (msec) and includes two slots 420 and a total of $N_{symb}^{DL}$ symbols for transmitting of data information, DCI, or RS. The first $M_{symb}^{DL}$ SF symbols can be used to transmit PDCCHs and other control channels (not shown) 430. The remaining $N_{symb}^{DL}-M_{symb}^{DL}$ symb SF symbols are primarily used to transmit PDSCHs 440. The transmission bandwidth consists of frequency resource units referred to as resource blocks (RBs). Each RB consists of $N_{sc}^{RB}$ sub-carriers, or resource elements (REs). For example, $N_{sc}^{RB}=12$. A UE 114 is allocated $M_{PDSCH}$ RBs for a total of $M_{sc}^{PDSCH}=M_{PDSCH} \cdot N_{sc}^{RB}$ REs for a PDSCH transmission bandwidth. A unit of 1 RB in frequency and 1 slot in time is referred to as physical RB (PRB). A unit of 1 RB in frequency and 1 SF in time is referred to as PRB pair. Some REs in some symbols contain CRS 450, CSI-RS or DMRS.

The SF symbols in FIG. 4 have a 'normal' cyclic prefix (CP) size and there are 14 symbols per SF. For operation in large cells, the SF symbols can have an 'extended' CP size and then there are 12 symbols per SF (see also REF 1).

To assist cell search and synchronization, DL signals also include synchronization signals such as a primary synchronization signal (PSS) and a secondary synchronization signal (SSS). Although having a same structure, the time-domain positions of synchronization signals within a frame differ depending on whether a cell is operating in frequency division duplex (FDD) mode or in time division duplex (TDD) mode. Therefore, after acquiring the synchronization signals, a UE 114 can determine whether a cell operates in FDD or in TDD and can determine a SF index within a frame. The PSS and SSS occupy the central 72 REs of a DL system bandwidth. The PSS and SSS inform of a physical cell identifier (PCID) for a cell and therefore, after acquiring the PSS and SSS, a UE knows the PCID of the cell (see also REF 1).

Figure 5:
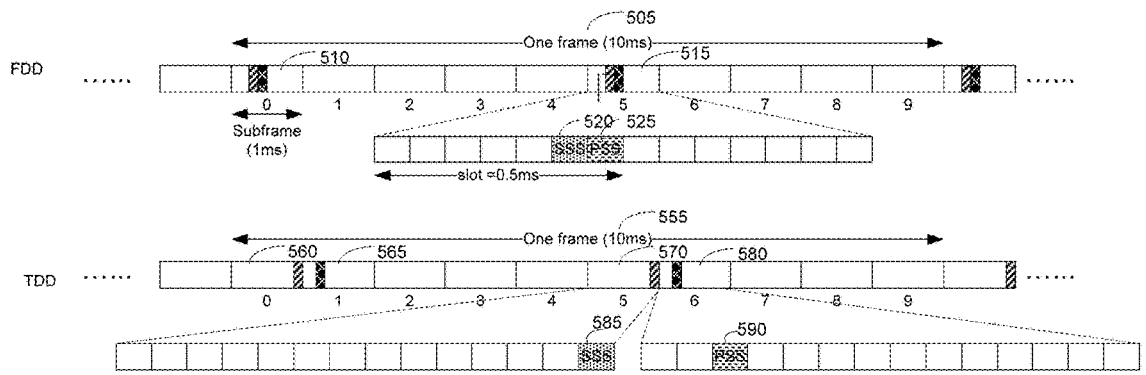
FIG. 5 illustrates example time domain positions for PSS and SSS for FDD and TDD according to this disclosure.

FIG. 5 illustrates example time domain positions for PSS and SSS for FDD and TDD according to this disclosure. The embodiment of the time domain positions for PSS and SSS shown in FIG. 5 is for illustration only. Other embodiments could be used without departing from the scope of the present disclosure.

In case of FDD, in every frame 505, a PSS 225 is transmitted in a last symbol of a first slot of SF #0 510 and SF #5 515. A SSS 520 is transmitted in a second last symbol of a same slot. In case of TDD, in every frame 555, a PSS 590 is transmitted in a third symbol of SF #1 565 and SF #6 580, while a SSS 585 is transmitted in a last symbol SF #0 560 and SF #5 570. The difference in the PSS and SSS positions between FDD and TDD allows a UE to determine the duplex mode on the cell after the UE detects PSS and SSS.

DL signaling also includes transmission of a logical channel that carries system control information and is referred to as broadcast control channel (BCCH). A BCCH is mapped to either a transport channel referred to as a broadcast channel (BCH) or to a DL shared channel (DL-SCH). A BCH is mapped to a physical channel referred to as physical BCH (P-BCH). A DL-SCH is mapped to a PDSCH. A BCH provides a master information block (MIB) while other system information blocks (SIBS) are provided by DL-SCHs. After UE 114 acquires a PCID for a cell, the UE 114 can perform DL channel measurement and use a CRS to decode PBCH and PDSCH.

A MIB includes a minimal amount of system information that is needed for UE 114 to be able to receive remaining system information provided by DL-SCH. More specifically, a MIB has predefined format and includes information of DL bandwidth, PHICH transmission configuration, system frame number (SFN) and 10 spare bits (see also REF 3 and REF 4). A PBCH is transmitted in the central 6 RBs (central 72 REs) of a DL system bandwidth in SF #0 in each frame. A MIB transmission is repeated over 4 frames. The 40 msec timing is detected blindly by UE 114 without requiring explicit signaling. In each SF, a PBCH transmission is self-decodable and UEs in good channel conditions can detect a MIB in less than 4 frames. Each PBCH transmission within a frame, from a period of 4 frames, is referred to as PBCH segment.

Figure 6:
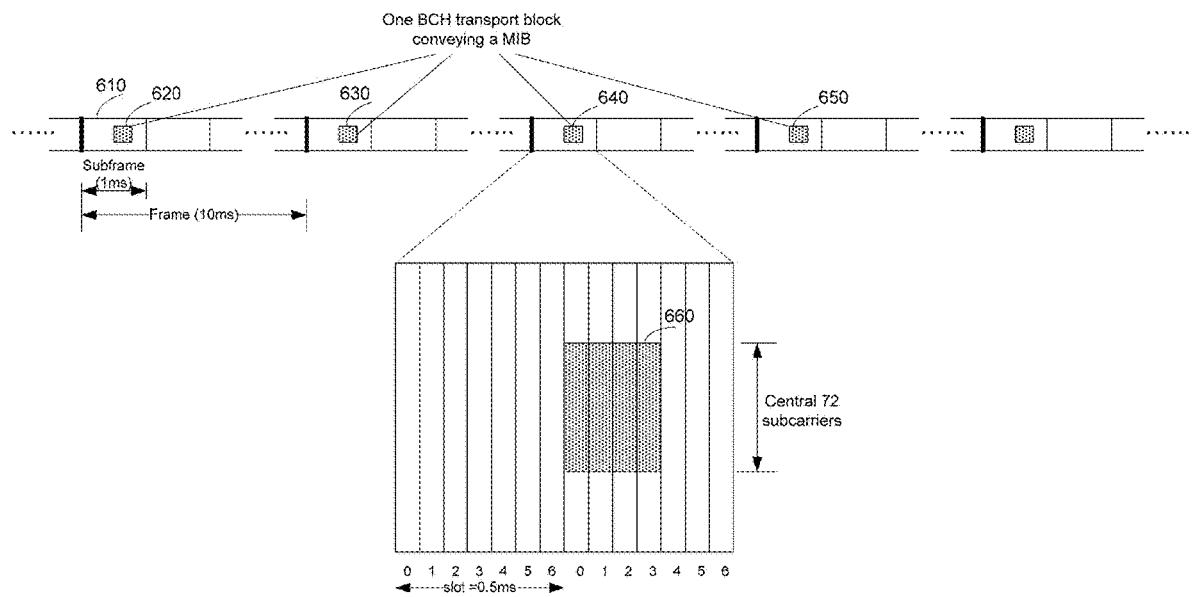
FIG. 6 illustrates example PBCH resource mapping according to this disclosure.

FIG. 6 illustrates example PBCH resource mapping according to this disclosure. The embodiment of the PBCH resource mapping shown in FIG. 6 is for illustration only. Other embodiments could be used without departing from the scope of the present disclosure.

One BCH transport block conveying a MIB is transmitted over a BCH transmission time interval (PBCH_TTI) of 40 msec. A coded BCH transport block is mapped to a first SF (SF #0) 610 of each frame in four consecutive frames 620, 630, 640, 650. A PBCH is transmitted in first four OFDM symbols of a second slot of SF #0 and in the central 6 RBs of the DL system bandwidth 660.

Most system information is included in different SIBs that are transmitted by DL-SCHs. SIM mainly includes information related to whether or not UE 114 is allowed to camp on a respective cell. In TDD, SIM also includes information about an allocation of UL/DL SFs and a configuration of a special SF (see also REF 1). SIM also includes information for scheduling of transmissions for remaining SIBs (SIB2 and beyond). SIM is transmitted in SF #5. SIB2 includes information that UEs need to access a cell, including an UL system bandwidth, RA parameters, and UL TPC parameters. SIB3-SIB13 mainly include information related to cell reselection, neighboring-cell-related information, public warning messages, etc. (see also REF 5).

In some wireless networks, UL signals include data signals conveying data information, control signals conveying UL control information (UCI), and UL RS. A UE 114 transmits data information or UCI through a physical UL shared channel (PUSCH) or a physical UL control channel (PUCCH), respectively. When UE 114 transmits data information and UCI in a same SF, the UE 114 can multiplex both in a PUSCH. UCI includes hybrid automatic repeat request acknowledgement (HARQ-ACK) information, indicating correct (ACK) or incorrect (NACK) detection for data TBs in a PDSCH or absence of a PDCCH detection (DTX), scheduling request (SR) indicating whether UE 114 has data in its buffer, rank indicator (RI), and channel state information (CSI) enabling eNB 102 to perform link adaptation for transmissions to UE 114. HARQ-ACK information is also transmitted by UE 114 in response to a detection of a PDCCH indicating a release of SPS PDSCH (see also REF 3); for brevity, this is not explicitly mentioned in the following descriptions. UL HARQ is synchronous and associated PDCCH or PHICH and PUSCH transmissions follow a predetermined timing relation (see also REF 3). CSI transmission can be periodic (P-CSI) in a PUCCH with parameters configured to UE 114 by higher layer signaling, such as radio resource control (RRC) signaling, or aperiodic (A-CSI) in a PUSCH as triggered by an A-CSI request field included in a DCI format scheduling a PUSCH or a PDSCH (see also REF 2 and REF 3).

UL RS includes DMRS and sounding RS (SRS). A UE 114 transmits DMRS only in a bandwidth of a respective PUSCH or PUCCH transmission. The eNB 102 can use a DMRS to demodulate data signals or UCI signals. The UE 114 transmits SRS to provide eNB 102 with an UL CSI. SRS transmission can be periodic (P-SRS) at predetermined SFs with parameters configured by higher layer signaling or aperiodic (A-SRS) as triggered by a DCI format scheduling PUSCH or PDSCH (see also REF 2 and REF 3). The UE 114 transmits SRS in one of two spectral combs that is configured to the UE 114 by higher layer signaling (see also REF 1 and REF 5).

Figure 7:
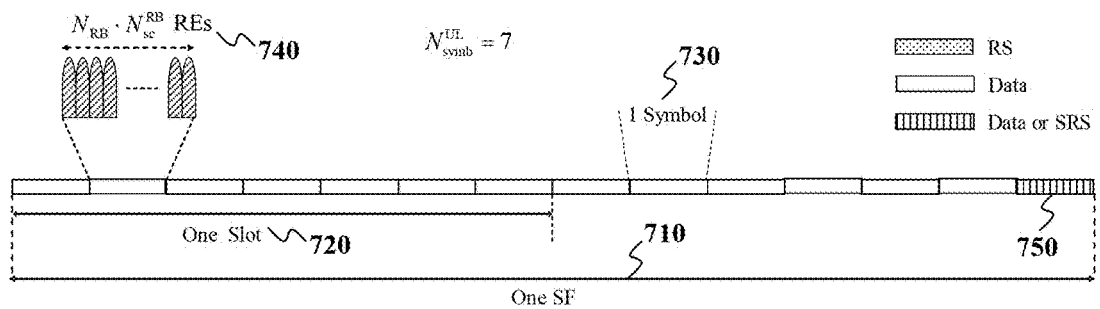
FIG. 7 illustrates an example UL SF structure according to this disclosure.

FIG. 7 illustrates an example UL SF structure according to this disclosure. The embodiment of the UL SF structure shown in FIG. 7 is for illustration only. Other embodiments could be used without departing from the scope of the present disclosure.

An UL SF 710 includes two slots. Each slot 720 includes $N_{symb}^{UL}$ symbols 730 for transmitting data information, UCI, DMRS, or SRS. A transmission bandwidth includes RBs as the frequency resource units. The UE 114 is allocated $N_{RB}$ RBs 740 for a total of $N_{RB} \cdot N_{sc}^{RB}$ REs for a transmission bandwidth. For a PUCCH, $N_{RB}=1$. A last symbol in a SF can be used to multiplex SRS transmissions 750 from one or more UEs. A number of symbols in a SF that are available for data/UCI/DMRS transmission is $N_{symb}=2 \cdot (N_{symb}^{UL}-1)-N_{SRS}$, where $N_{SRS}=1$ when a last SF symbol can be used to transmit SRS and $N_{SRS}=0$ otherwise.

Figure 8:
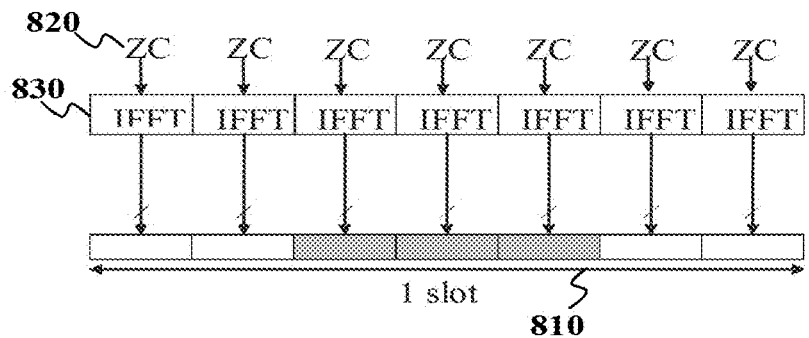
FIG. 8 illustrates an example structure for a SR signal transmission in one of two slots of a SF in a PUCCH according to this disclosure.

FIG. 8 illustrates an example structure for a SR signal transmission in one of two slots of a SF in a PUCCH according to this disclosure. The embodiment of the structure for the SR signal transmission shown in FIG. 8 is for illustration only. Other embodiments could be used without departing from the scope of the present disclosure.

In a first slot of a SF 810, UE 114 transmits a Zadoff-Chu (ZC) sequence (see also REF 1) 820 after performing an inverse fast Fourier transform (IFFT) 830. A first orthogonal covering code (OCC) of length 4 is applied on the first two and last two transmission symbols and a second OCC of length 3 is applied on the middle three transmission symbols. SR transmission is by on-off keying where UE 114 transmits signaling when the UE 114 indicates a SR (positive SR) and the UE 114 does not transmit signaling when the UE 114 does not indicate a SR (negative SR). The SR transmission structure in a second slot of a SF is same as in the first slot of the SF with the exception that the last symbol can be punctured for UEs to transmit SRS.

The eNB 102 needs to enable UE 114 to request a connection setup by the UE 114 performing a random access (RA). RA is used for several purposes including initial access for establishing a radio link, re-establishing a radio link after radio link failure, handover when UL synchronization needs to be established to a new cell, UL synchronization, UE 114 positioning based on UL measurements, and as a SR particularly when the UE 114 is not configured dedicated SR resources with short periodicity on a PUCCH. Acquisition of UL timing at the eNB 102 is one of the main objectives of RA; when the UE 114 establishes an initial radio link, a RA process also serves for the eNB 102 to assign a unique identity to the UE 114 through a C-RNTI. A RA preamble transmission from UE 114 can be either contention based, where multiple UEs share a same pool of resources, or contention-free where a dedicated resource is assigned to the UE 114 by the eNB 102 (see also REF 1 and REF 4).

A RA preamble transmission by UE 114 can also be initiated by a "PDCCH order" from the eNB 102 in SF n where, in response to the PDCCH order, the UE 114 transmits a RA preamble in the first SF n+$k_2$, $k_2 \geq 6$, where a RA preamble resource is available. When the UE 114 is configured with multiple timing advance groups (TAGs) and configured with a carrier indicator field (CIF) for a given serving cell, the UE 114 uses the CIF value in the DCI format from the detected "PDCCH order" to determine the serving cell for the corresponding RA preamble transmission (see also REF 2 and REF 3).

Figure 9:
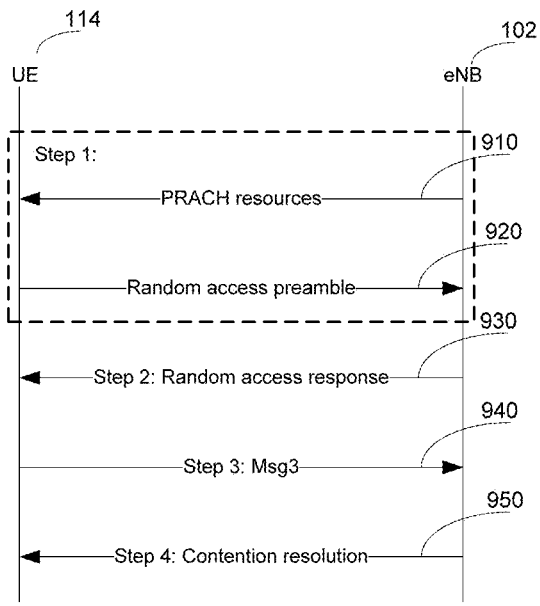
FIG. 9 illustrates an example RA process according to this disclosure.

FIG. 9 illustrates an example RA process according to this disclosure. While the signal depicts a series of sequential steps or signals, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing and transceiver circuitry transmitter chain in, for example, a base station and processing and transceiver circuitry transmitter chain in, for example, a mobile station.

In Step 1, a UE 114 acquires information for physical RA channel (PRACH) resources 910 through a SIB transmitted from an eNB 102 and determines PRACH resources for a transmission of a RA preamble 920 (also referred to as PRACH preamble). In Step 2, the UE 114 receives a RA response (RAR) 930 from the eNB. In Step 3, the UE 114 transmits a message 3 (Msg3) 940 to the eNB 102. Msg3 can include a request for an RRC connection to the eNB. In Step 4, the UE 114 transmits a contention resolution message to the eNB 102 that is also referred to as message 4 (Msg4)—see also REF 4.

The growth of applications for MTC is expected to increase in the near future and the number of MTC UEs in a cell can be in an order of several tens of thousands. Even though traffic generated from MTC UEs is expected to be small in size and sporadic, the vast number of MTC UEs that needs to be served by an eNB can put a significant strain in the already scarce available licensed bandwidth particularly as demand of data traffic for human communications continues to grow. It is therefore beneficial that additional sources of available bandwidth are utilized for MTC.

The Federal Communications Commission (FCC) defined unlicensed carriers to provide cost-free public access spectrum. Use of unlicensed carriers by a device is allowed only under the provisions that the device does not generate noticeable interference to communications on licensed carriers and that communications on unlicensed carriers are not protected from interference. For example, unlicensed carriers include the industrial, scientific and medical (ISM) carriers and the unlicensed national information infrastructure (UNIT) carriers that can be used by IEEE 802.11 devices. Usage of unlicensed carriers is favorable to MTC as typical applications can be tolerant to the increased latency and reduced QoS that can occur as an unlicensed carrier may not always be available for communication, for example due to fairness sharing requirements with other devices or due to an existence of a priority device, and as interference coordination on unlicensed carriers may not be as efficient as on licensed carriers. For example, in carrier sense multiple access (CSMA), before a UE, such as UE 114 or an eNB, such as eNB 102, transmits, the UE 114 or the eNB 102 monitors a carrier for a predetermined time period to perform a clear channel assessment (CCA) and determine whether there is an ongoing transmission by another device on the carrier. If no other transmission is sensed on the carrier, the UE or the eNB can transmit; otherwise, the UE 114 or the eNB 102 postpones transmission.

Coverage enhancements (CE) for DL or UL signaling can be required for several applications including MTC applications. UEs can be installed in basements of buildings or, generally, in locations experiencing large penetration loss. In extreme coverage scenarios, UEs may have characteristics such as very low data rate, large delay tolerance, and limited mobility. Not all UEs require CE or require a same amount of CE. Also, coverage limited UEs typically require low power consumption and communicate with infrequent data burst transmissions. In addition, in different deployment scenarios, a required CE can be different for different eNBs, for example depending on an eNB transmission power or an associated cell size, as well as for different UEs, for example depending on a location of a UE. CE for a channel/signal is typically supported by repetitions of the channel/signal transmission either in a time domain or on a frequency domain. Therefore, as CE support consumes additional resources and consequently result to lower spectral efficiency, it is beneficial to enable proper adjustments of resources according to a required CE level.

As an eNB 102 cannot know with precise accuracy a CE level required by UE 114 and as a power available for transmitting PDCCH repetitions can vary in time, it is beneficial for an eNB 102 to configure UE 114 to monitor PDCCH for multiple repetition numbers in order to provide flexibility to the eNB 102 to optimize use of power and bandwidth resources and accordingly adjust a number of PDCCH repetitions. Using an adaptive number of PDCCH repetitions also requires that an eNB 102 and UE 114 have a same understanding for the number of PDCCH repetitions because, otherwise, the UE 114 can attempt to receive PDSCH or transmit PUSCH in incorrect respective SFs. Similar, for PDSCH or PUSCH, UE 114 needs to know a respective number of repetitions in order for the eNB 102 and the UE to have a same understanding of SFs used for transmission of acknowledgement signaling in response to a PDSCH reception or PUSCH transmission.

Embodiments of this disclosure provide mechanisms for an eNB 102 and UE 114 to communicate on a licensed carrier and on an unlicensed carrier. Embodiments of this disclosure also provide mechanisms for UE 114 to perform a RA process in general and a RA preamble transmission in particular on an unlicensed carrier. Embodiments of this disclosure additionally provide mechanisms for UE 114 or an eNB 102 to access an unlicensed carrier and for the UE to perform transmissions of data TBs on the unlicensed carrier. Embodiments of this disclosure further provide mechanisms for UE 114 to signal to an eNB 102 an inability to transmit on an unlicensed carrier and for UE 114 to signal to an eNB 102 a presence of hidden nodes. Embodiments of this disclosure further provide mechanisms for an eNB 102 to communication with UE 114 in coverage enhanced operation on an unlicensed carrier.

The following embodiments are not limited to an MTC UE and can be applicable to any type of UE 114. For brevity, FDD is considered for the duplex mode in both DL and UL but the embodiments of the disclosure are also directly applicable to TDD by making respective adjustments for example as described in REF 3. The terms 'carrier' and 'cell' can be used interchangeably to denote the DL or UL communication medium.

Communication on a Licensed Carrier and on an Unlicensed Carrier

For many applications, such as MTC applications, traffic is UL-dominant. Information packets are generated from UEs and transmitted to an eNB 102 while information from the eNB 102 to the UEs is typically limited to transmission of DCI formats scheduling PUSCH transmissions, when SPS is not used, or RRC configuration messages that can be provided either individually to each UE or, more efficiently when appropriate, by paging UEs for SI updates.

Because transmission from a device on an unlicensed carrier can depend on whether or not the device senses the unlicensed carrier to be idle (free) of transmissions from other devices, based on a clear channel assignment (CCA) process using for example a listen-before-talk (LBT) mechanism (see also REF 7), communication protocols that rely on DL signaling occurring at predetermined time instances on licensed carriers, such as PSS/SSS or PBCH, need to be modified for operation on an unlicensed carrier and cannot be supported in a same manner as on a licensed carrier. Moreover, even when an eNB 102 senses an unlicensed carrier to be idle, this may occasionally not be the case from the perspective of at least one UE because another transmitting device can exist that experiences a small propagation loss to the UE 114 and is detected by the UE 114 but experiences a large propagation loss to the eNB 102 and is not detected by the eNB 102. This is typically referred to as the hidden node problem. When a hidden node exists, a transmission from an eNB 102 to UE 114 create interference to the hidden node device and may be incorrectly detected by the UE 114 when it overlaps in bandwidth, at least partially, with a transmission to or from the hidden node device.

In one embodiment, the disclosure considers that UE 114 establishes initial synchronization and obtains system information (MIB, SIBS) using a licensed carrier. Subsequent DL communication can continue on the licensed carrier, as this ensures reliable RRC connection support for the UE 114 and does not materially penalize the spectrum usage on the licensed carrier (when traffic from UE 114 is UL dominant), or PDCCH/PDSCH/RS transmissions can also occur on the unlicensed carrier. Subsequent UL communication can be transferred on an unlicensed carrier particularly when an application associated with UL transmission is delay tolerant and does not require strict QoS.

In a first approach, a SIB, such as SIB2, includes information for a number of unlicensed carriers UE 114 can select for UL transmissions, starting from a RA preamble transmission. The information provided by the SIB can include same information as provided by a SIB for UEs communicating only on licensed carries and also include information associated with DL/UL signaling on each unlicensed carrier as it is subsequently described. Alternatively, the additional information can be provided by a separate SIB (UC-SIB). If a transmission of a PDSCH that conveys the UC-SIB is scheduled by a DCI format, a different DCI format than for scheduling a SIB is used or a different SI-RNTI (UC-SI-RNTI) is used. The additional information for each unlicensed carrier can include information related to a RA process and information related to UL transmissions such as an UL transmission bandwidth, parameters for UL TPC, and so on (see also REF 5 for UL transmission parameters provided by a SIB). Information for a RA process can include parameters for RA preamble transmission, RA preamble power ramping, RAR transmission, and a maximum number of HARQ transmissions for Msg3. The information can be according to the duplex mode (FDD or TDD) on each unlicensed carrier that can be independent of the duplex mode on a licensed carrier. When a transmission of an UL channel is not supported on an unlicensed carrier, such as for example a PUCCH transmission, respective information is not included in the SI for the unlicensed carrier.

When UE 114 cannot transmit a RA preamble on an unlicensed carrier due to sensing a transmission from another device on the unlicensed carrier, the UE 114 attempts transmission at a next opportunity for RA preamble transmission. A transmission opportunity for RA preamble transmission is defined by a SF in a set of SFs informed by SI to the UE 114 for RA preamble transmission. As it is subsequently described, an eNB 102 can reserve an unlicensed carrier prior to a SF that can be used for RA preamble transmission.

When UE 114 needs to transmit Msg3 on an unlicensed carrier, as part of a RA process, and cannot transmit an Msg3 in response to a RAR reception in a predetermined SF, such as the sixth SF after receiving the RAR, due to sensing transmission from another device on the unlicensed carrier, the following three options are considered.

In a first option, Msg3 transmission is always only on the licensed carrier.

In a second option, the UE 114 can attempt transmission of Msg3 on the unlicensed carrier in a first SF from a configured set of SFs where the UE 114 senses the unlicensed carrier to be free until either the UE 114 transmits Msg3 or until a maximum number of SFs for attempting Msg3 transmission is reached and then the UE 114 starts the RA process from the beginning. In such case, the UE 114 does not increment a RA preamble transmission counter as there was no RA preamble detection failure and the RA process failure was due to the unlicensed carrier being unavailable. For example, an eNB 102 can inform UE 114 of the maximum number of SFs the UE 114 can attempt to transmit Msg3 on the unlicensed carrier. The maximum number of SFs can be informed by a SIB, or by RRC signaling, or by a RAR scheduling the Msg3 transmission, or be predetermined in the system operation.

In third option, a RA process on the unlicensed carrier is limited only to RRC_CONNECTED UEs (see also REF 4 and REF 5) and the initial RA process for UE 114 to establish RRC connection occurs only on a licensed carrier. In such case, an Msg3 transmission on the unlicensed carrier is not needed as timing alignment for transmissions from the UE 114 to the eNB 102 on the unlicensed carrier can be obtained by the RA preamble transmission on the unlicensed carrier.

In one alternative, when UE 114 cannot complete a RA process on an unlicensed carrier and a maximum number of RA preamble transmissions are reached, the UE 114 starts a new RA process on another unlicensed carrier, if any. The maximum number of RA preamble transmissions on an unlicensed carrier can be indicated in the SIB, or be configured by RRC signaling to UE 114, or be predetermined in the system operation. In another alternative, the UE 114 can perform random back off and start again a RA process on the same unlicensed carrier.

In a second approach, UE 114 transmitting on an unlicensed carrier first establishes RRC connection with an eNB 102 on a licensed carrier. The eNB 102 can subsequently configure, using for example RRC signaling, the UE 114 to transmit on an unlicensed carrier. When the UE 114 cannot simultaneously transmit on multiple carriers, the UE 114 stops transmitting on the licensed carrier so that the UE 114 transmits only on one UL carrier at a given time instance. The RRC_signaling can include information related to a RA process on the unlicensed carrier, where the RA process either includes only RA preamble transmission or also includes the remaining messages, as well as other information such as the unlicensed carrier bandwidth, parameters for UL TPC on the unlicensed carrier, and a configuration of UL SFs and DL SFs on the unlicensed carrier. The information can be according to the duplex mode (FDD or TDD) on the unlicensed carrier that can be same or different than the duplex mode on the licensed carrier. The UE 114 can switch to the unlicensed carrier for UL transmissions after transmitting HARQ-ACK information (ACK value) on the licensed carrier to acknowledge successful reception of the RRC signaling.

UE 114 can also transmit a RA preamble to establish synchronization with an eNB 102 on an unlicensed carrier after receiving a PDCCH order on a licensed carrier to transmit the RA preamble on the unlicensed carrier. When UE 114 cannot transmit the RA preamble due to sensing transmission from another device on the unlicensed carrier then, in a first option, the UE 114 attempts transmission at a next SF from the set of SFs the UE 114 is configured for RA preamble transmission. In a variation of the first option, a PDCCH order for RA preamble transmission on an unlicensed carrier can be associated with a number of attempts that is indicated by the DCI format of the PDCCH order. In a second option, the UE 114 transmits a contention-based RA preamble on the licensed carrier to reestablish UL synchronization with the licensed carrier. In a third option, the UE 114 transmits another RA preamble on the unlicensed carrier when the UE 114 detects a new PDCCH order from the eNB 102.

When UE 114 cannot transmit a RA preamble on the unlicensed carrier due to sensing transmission from another device, the UE 114 transmits a NACK on a PUCCH resource on the licensed carrier. The PUCCH resource can be determined from the CCE with the lowest index from the CCEs of the PDCCH (see also REF 3) associated with the PDCCH order.

Figure 10:
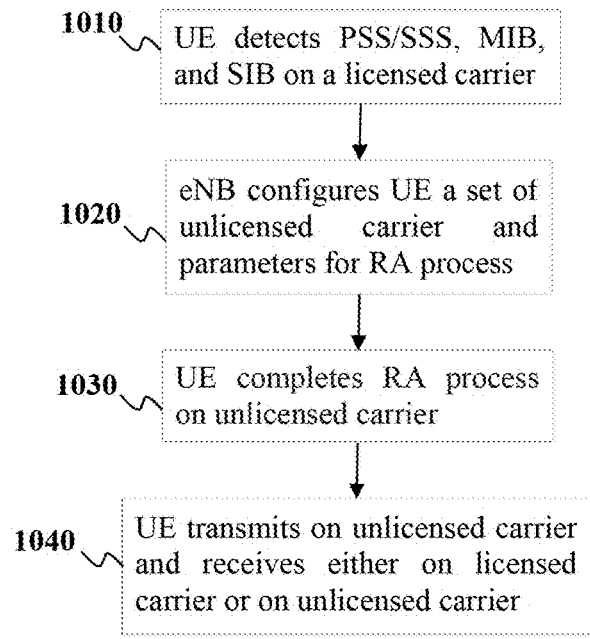
FIG. 10 illustrates a process for initial access on an unlicensed carrier by a UE according to this disclosure.

FIG. 10 illustrates a process for initial access on an unlicensed carrier by a UE according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processing circuitry and a transmitter chain in, for example, a UE.

UE 114 first establishes, on a licensed carrier, synchronization with an eNB 102 by detecting PSS/SSS, detecting PBCH to obtain SFN and DL bandwidth information, and detecting SIBs to determine UL transmission parameters on the licensed carrier in operation 1010. The SIBs can also provide UL transmission parameters for one or more unlicensed carriers or a separate SIB can be used to provide such information. The eNB 102 configures the UE 114 one or more unlicensed carriers where the configuration can be either by SIB or by UE-specific higher layer signaling such as RRC signaling. The eNB 102 provides the UE 114 information for the UE 114 to perform a RA process on an unlicensed carrier wherein the information includes the unlicensed carrier bandwidth and parameters related to RA preamble transmission in operation 1020. The UE 114 completes the RA process on the unlicensed carrier in operation 1030 where the RA process can include only RA preamble transmission or can also include the remaining messages associated with a RA process that can be transmitted either on the licensed carrier (for example, the RAR or Msg4) or on the unlicensed carrier (for example, the Msg3). After successful completion of the RA process, the eNB 102 can configure the UE 114 to transmit on the unlicensed carrier. The eNB 102 can also configure the UE 114 to receive on the unlicensed carrier or the UE 114 can continue receiving on the licensed carrier in operation 1040.

The licensed carrier and the unlicensed carrier can have a large frequency separation that can result to different propagation environments for transmitted signals and different reception timings at the eNB 102 and the UE 114 as the reception points on the licensed carrier and on the unlicensed carrier can be in different locations (the licensed carrier and the unlicensed carrier correspond to different cells). By the UE 114 transmitting a RA preamble on the unlicensed carrier, instead of the licensed carrier, the eNB 102 can obtain UL timing information and establish synchronization with the UE 114 through a Timing Advance (TA) command (see also REF 3).

UE 114 can also inform an eNB 102 that the UE 114 has data to transmit using a RA preamble transmission on an unlicensed carrier and the eNB 102 can avoid configuring a SR resource on a licensed carrier for the UE 114. This can be advantageous as it can also provide UL timing adjustment because the UE 114 can often be in an RRC_IDLE state (see also REF 5) for an extended time period prior and, in the meantime, the channel medium can change and the UE 114 clocks can drift. This is also advantageous in avoiding reserving resources on the licensed carrier that may be infrequently used for SR transmissions. Moreover, the UE 114 does not need to switch its UL frequency to the licensed carrier in order to transmit SR and then switch it back to the unlicensed carrier for a subsequent PUSCH transmission. Although the unlicensed carrier may not be available for a RA preamble transmission immediately when UE 114 wants to indicate that the UE 114 has data to transmit, this can be acceptable for delay tolerant applications.

UE Transmissions on an Unlicensed Carrier

UE 114 (or an eNB 102) that operates using CSMA and LBT does not transmit to an eNB 102 (or to UEs) when the UE 114 (or the eNB 102) senses another device transmitting on the unlicensed carrier (CCA determines that the unlicensed carrier is not available). Also, when the UE 114 (or the eNB 102) senses that the unlicensed carrier is available, the UE 114 (or the eNB 102) can wait for a certain time period to ensure the carrier remains available before transmitting. For example, for compatible operation with an IEEE 802.11 based network that can coexist on the unlicensed carrier, the time period can be larger than the short inter-frame space (SIFS) that is typically about 10 microseconds (see also REF 7). After the UE 114 or the eNB 102 obtains access to the unlicensed carrier, the UE 114 or the eNB 102 can keep control of the unlicensed carrier by keeping a minimum gap of a SIFS time period between successive transmissions. The UE 114 or the eNB 102 can maintain continuous access on the unlicensed carrier for time periods that depend on a world region and typically range from 4 msec to 10 msec. Transmissions from the eNB 102 or from UEs in successive SFs can reserve the unlicensed carrier over a period of several SFs by occupying a large percentage, such as 90%, of the unlicensed carrier bandwidth.

A PUSCH transmission can be adaptive and scheduled by a DCI format that an eNB 102 transmits in a PDCCH on a licensed carrier or an unlicensed carrier, non-adaptive triggered by a NACK value in a PHICH that the eNB 102 transmits on the licensed carrier or the unlicensed carrier, or SPS. If UE 114 has relaxed latency requirements, an inability of the UE 114 to transmit, due to sensing transmissions from another device on the unlicensed carrier, is not an important concern even when it occurs over several consecutive attempts for transmission by the UE 114. However, an inability from the UE 114 to transmit PUSCH on the unlicensed carrier can have an impact on the licensed carrier when the PUSCH transmission is scheduled by a DCI format in a PDCCH transmitted on the licensed carrier as the eNB 102 may need to transmit another DCI format to reschedule transmission for the same data TB. Due to UE 114 processing requirements, the time difference between a SF where UE 114 transmits a PUSCH and a SF where the UE 114 detects a DCI format scheduling the PUSCH is typically at least four SFs. Although an absence of a PUSCH transmission can be due to a missed detection of a respective DCI format, a more typical reason for an absence of a PUSCH transmission on an unlicensed carrier can be that the UE 114 determines the unlicensed carrier to be unavailable (due to transmission from another device) at the SF of the scheduled PUSCH transmission. Then, even though an unlicensed carrier can be used to avoid having a licensed carrier support transmissions from UEs, the DL licensed carrier providing DCI formats for scheduling on the unlicensed carrier can experience increased overhead when DCI formats need to be retransmitted due to the unlicensed carrier being unavailable for PUSCH transmissions. Moreover, unless PHICH is use to trigger non-adaptive PUSCH retransmissions, this problem can have a cascading effect as, due to carrier sensing, UE 114 again be unable to transmit the PUSCH that is rescheduled by another DCI format.

For operation on a licensed carrier, the UE 114 retransmits the data TB using a next redundancy version (RV) for the same HARQ process (see also REF 2 and REF 3) in response to a detection of a NACK value on a PHICH or in response to a DCI format detection having a new data indicator (NDI) field with a value of 0 to indicate a retransmission for a same data TB. In a first approach, in order to optimize reception reliability for a detection of a data TB on an unlicensed carrier, and unlike operation on a licensed carrier, the UE 114 can use the same RV when the UE 114 retransmits a data TB due to the unlicensed carrier not being available in the previous attempt to transmit the data TB. In a second approach, in order to simplify operation and support the case that an eNB 102 receiver does not perform or cannot perform accurate PUSCH DTX detection, the UE 114 can use the next RV to retransmit a data TB for a HARQ process even when the UE 114 did not actually transmit the data TB for the previous RV. An eNB 102 can configure UE 114 whether the UE 114 shall follow the first approach or the second approach where the configuration can be by SI and common to all UEs or by RRC signaling and specific to each UE 114.

If a PUSCH transmission by UE 114 is triggered by NACK detection on a PHICH in SF n, the UE 114 is expected to retransmit a data TB for a respective HARQ process in a PUSCH in SF n+4 (or a later SF in TDD when SF n+4 is not an UL SF)—see also REF 3. When a PUSCH transmission is SPS having a periodicity, when the UE 114 is unable to transmit PUSCH in a SF due to the unlicensed carrier being occupied by the transmission from another device, the UE 114 suspends the PUSCH transmission and attempts to transmit again at the next SF determined by the SPS periodicity.

Similar to an adaptive PUSCH transmission, when UE 114 is unable to retransmit a data TB in a PUSCH, an eNB 102 needs to revert to an adaptive retransmission as the eNB 102 cannot determine with certainty whether the UE 114 incorrectly interpreted the NACK as an ACK and did not retransmit the TB or whether the UE 114 was unable to transmit due to the unlicensed carrier being unavailable. In case the eNB 102 cannot properly implement PUSCH DTX detection (for example, DTX detection may not be functional when another device is transmitting), an incorrect detection of a data TB for the PUSCH retransmission (as hypothesized by the eNB 102) can have a same effect as an absence of a PUSCH retransmission by the UE 114. The overall behavior is then similar to a NACK-to-ACK error as the UE 114 does not retransmit the PUSCH when the eNB 102 expects the UE 114 to do so and, unlike a NACK-to-ACK error event that typically occurs with very low probability, an inability of UE 114 to transmit on an unlicensed carrier can occur with a much higher probability. As it is subsequently described, this problem can be mitigated by indication from the UE 114 at least when the UE 114 is not capable to transmit the PUSCH.

Figure 11:
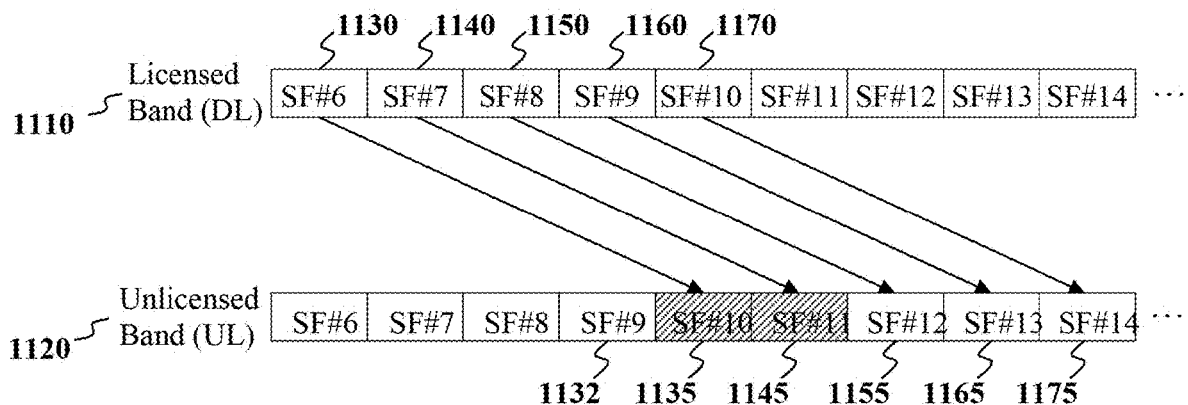
FIG. 11 illustrates a process for a transmission by an eNB of a DCI format scheduling a PUSCH transmission from a UE on an unlicensed carrier and the UE performing the PUSCH transmission or suspending the PUSCH transmission according to this disclosure.

FIG. 11 illustrates a process for a transmission by an eNB 102 of a DCI format scheduling a PUSCH transmission from UE 114 on an unlicensed carrier and the UE 114 performing the PUSCH transmission or suspending the PUSCH transmission according to this disclosure. The embodiment of the process shown in FIG. 11 is for illustration only. Other embodiments could be used without departing from the scope of the present disclosure.

An eNB 102 transmits on a licensed carrier 1110 and in respective SF #6 1130, DCI formats scheduling PUSCH transmissions for a first group of UEs on an unlicensed carrier 1120 in SF #10 1135. One or more UEs from the first group of UEs is not be able to transmit PUSCH in SF #10 1135 due to sensing another device transmitting shortly before SF #10 1132. The eNB 102 also transmits on the licensed carrier 1110 and in respective SF #7 1140, DCI formats scheduling PUSCH transmissions for a second group of UEs on the unlicensed carrier 1120 in SF #11 1145. One or more UEs from the second group of UEs is not be able to transmit PUSCH in SF #11 1145 due to sensing another device transmitting shortly before SF #11 1135. The eNB 102 further transmits on the licensed carrier 1110 and in SF #8 1150, SF #9 1160, and SF #10 1170, DCI formats scheduling PUSCH transmissions for a third, fourth, and fifth groups of UEs, respectively, on the unlicensed carrier 1120 in SF #12 1155, SF #13 1165, and SF #14 1175, respectively. Devices not served by the eNB 102 are not sensed in respective SF #12 1155, SF #13 1165, and SF #14 1175, and the UEs transmit the respective PUSCHs. Although the above description considered transmission of DCI formats by the eNB 102, the same UE 114 behavior for PUSCH transmissions or suspensions of PUSCH transmissions applies in case of PHICH triggered PUSCH transmissions or in case of SPS PUSCH transmissions.

In all above cases for a PUSCH transmission (scheduled by DCI format, PHICH triggered, or SPS), even though the data TB for a respective HARQ process is not transmitted by UE 114, the UE 114 attempts to transmit a data TB for a HARQ process with the next higher index (modulo the total number of HARQ processes) in case a number of UL HARQ processes for the UE 114 is larger than one. This enables synchronous UL HARQ operation.

When asynchronous UL HARQ operation is used on an unlicensed carrier, as opposed to a synchronous HARQ operation on a licensed carrier, the UE 114 can retransmit a data TB in a later SF that, unlike synchronous HARQ, does not need to be determined according to the HARQ process number. This avoids an excessive delay for a transmission of a data TB associated with a HARQ process after a transmission opportunity is missed, especially when the total number of HARQ processes is not small. This also requires an eNB 102 and UE 114 to have a same understanding of the HARQ process used in a PUSCH transmission and, therefore, the eNB 102 needs to have highly accurate determination of a suspended PUSCH transmission by UE 114. This can be accomplished by PUSCH DTX detection at the eNB 102, or by the eNB 102 sensing the unlicensed carrier (although a hidden node problem can exist), or by other signaling from the UE 114 such as SRS signaling in a SF prior to the PUSCH transmission SF or by explicit indication by the UE 114 of whether the UE 114 transmitted a PUSCH as it is subsequently described.

UE 114 can be configured to attempt a transmission of a data TB using same RBs in P consecutive SFs or using same RBs and same SF in P consecutive frames. This can ensure that excessive delays for a transmission of a data TB are avoided when, for example, a SPS PUSCH transmission periodicity is large and the UE 114 happens to be unable to transmit in a SF where it is configured a PUSCH transmission on an unlicensed carrier. When the UE 114 cannot simultaneously transmit more than one PUSCH, the above mechanism requires that an eNB 102 is restricted from configuring PUSCH transmissions to UE 114 within P SFs from a first SF of a configured PUSCH transmission as such PUSCH transmissions can collide with a PUSCH transmission the UE 114 suspended in the first SF. This can be acceptable for applications with relaxed latency such as MTC applications. Nevertheless, when the UE 114 can simultaneously transmit more than one data TB, the eNB 102 can schedule respective PUSCHs in non-overlapping sets of RBs on the unlicensed carrier and the UE 114 can be configured to transmit the more than one data TBs in a same SF that is available for transmission on the unlicensed carrier. The data TBs correspond to different HARQ processes and the sets of RBs correspond to ones where the UE 114 was not able to transmit data TBs in previous SFs. Alternatively, in case of P=2, the UE 114 can apply spatial multiplexing to transmit two data TBs corresponding to different HARQ processes in a same PUSCH. Asynchronous HARQ operation can apply in such cases. The configuration to transmit in P consecutive SFs can be either by higher layer signaling, such as RRC signaling, or by including an IE with $\lceil \log_2 P \rceil$ bits in a DCI format scheduling the PUSCH transmission where $\lceil \ \rceil$ is the ceiling function that rounds a number to its immediately next larger integer.

Figure 12A:
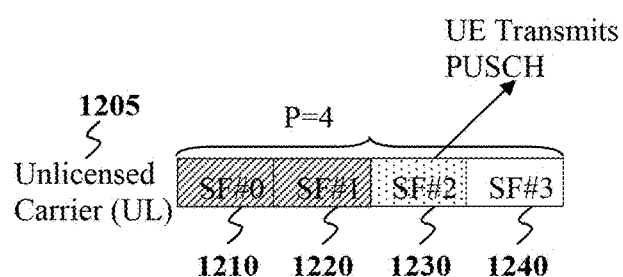
FIGS. 12A and 12B illustrate a transmission of a data TB for a HARQ process in a PUSCH in one of possible P SFs according to this disclosure.
Figure 12B:
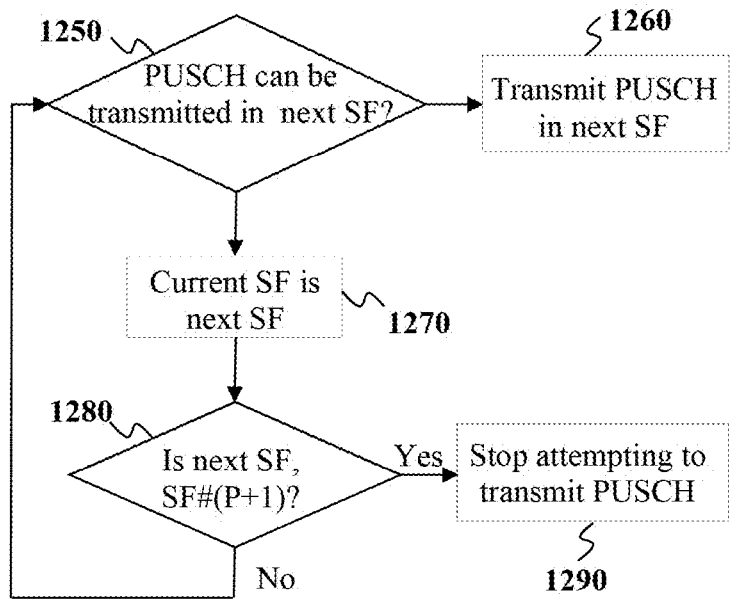

FIGS. 12A and 12B illustrate a transmission of a data TB for a HARQ process in a PUSCH in one of possible P SFs according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processing circuitry and a transmitter chain in, for example, a UE.

UE 114 transmitting to an eNB 102 on an unlicensed carrier 1205 is configured by the eNB 102 to attempt to transmit a PUSCH in one of P successive UL SFs. The UE 114 is also configured by the eNB 102 to transmit a PUSCH in a first SF, SF #0 1210. The configuration of SF #0 1210 can be either dynamic by a DCI format, or by a PHICH for a synchronous HARQ process, or semi-static by RRC signaling. The UE 114 determines, for example using CSMA as in IEEE 802.11 (see also REF 7), that a device not served by the eNB 102 transmits prior to SF #0 1210 and the UE 114 does not transmit the PUSCH in SF #0. The UE 114 subsequently determines that a device not served by the eNB 102 transmits prior to SF #1 1220 and the UE 114 does not transmit the PUSCH in SF #1. The UE 114 subsequently determines that a device not served by the eNB 102 does not transmit prior to SF #2 1230 and the UE 114 transmits the PUSCH in SF #2. Additionally, in SF #2, the UE 114 can transmit multiple data TBs over non-overlapping PRBs, where the data TBs can correspond to suspended PUSCH transmissions in SF #0 and SF #1 and a scheduled PUSCH transmission in SF #2. The UE 114 does not transmit a PUSCH in SF #3 1240. The procedure for the UE 114 configured by the eNB 102 to attempt a PUSCH transmission in one of P successive UL SFs includes the following steps. First the UE 114 determines whether the UE 114 can transmit a PUSCH in a next SF in operation 1250, where the first next SF is the first SF the UE 114 is configured by the eNB 102 to transmit PUSCH. When the UE 114 can transmit the PUSCH, the UE 114 transmits the PUSCH in the next SF in operation 1260. If the UE 114 cannot transmit the PUSCH, the UE 114 sets the next SF as current SF in operation 1270 and determines whether the next SF is SF #(P+1) in operation 1280. When it is, the UE 114 stops attempting to transmit the configured PUSCH in operation 1290. When it is not, the UE 114 repeats the procedure (continues from operation 1250). When the UE 114 can transmit PUSCH in a SF, the UE 114 can transmit PUSCH in multiple sets of RBs where sub-sets of non-overlapping RBs convey different data TBs including data TBs from previously suspended PUSCH transmissions that were scheduled in respective sets of RBs.

In a second alternative, the eNB 102 senses an unlicensed carrier before a first SF where the eNB 102 configures UEs to transmit respective PUSCHs and, when no signal transmission from another device is detected, the eNB 102 transmits a RS (or any other signal/channel, such as a PDSCH or PDCCH) on the unlicensed carrier to reserve the unlicensed carrier for PUSCH transmissions from UEs in the first SF. The combination of DL transmissions, such as RS and PDSCH/PDCCH, is continuous from a time the eNB 102 senses the unlicensed carrier to be available until the first SF of configured PUSCH transmissions. In order to increase a probability that the eNB 102 can reserve the unlicensed carrier, the eNB 102 can start the combination of DL transmissions, such as for RS and PDSCH/PDCCH, at an earlier time such as more than one SF prior to the first SF of configured PUSCH transmissions. The UE 114 can also determine whether or not the UE 114 can transmit a configured PUSCH based on whether or not, respectively, the UE 114 can detect a RS transmission from the eNB 102 prior to SF for the configured PUSCH transmission. This method requires DL transmissions on the unlicensed carrier and is susceptible to the hidden node problem. In order to avoid self-interference from simultaneously transmitting and receiving on the unlicensed carrier, the eNB 102 can switch into a receiving mode during one or more last symbols of a last SF with DL transmissions and, in order to maintain use of the unlicensed carrier, configure one or more UEs to transmit SRS (or any other type of UL signaling) in the one or more last symbols of the last SF with DL transmissions. Alternatively, the eNB 102 can configure one or more UEs to transmit SRS in one or more first symbols of a first SF for PUSCH transmissions. Then, instead of the eNB 102 performing rate matching to PDSCH/PDCCH transmissions to accommodate SRS transmissions in last symbols of a SF with DL transmissions, UE 114 performs rate matching to a PUSCH transmission to accommodate SRS transmissions in first symbols of a SF with UL transmissions.

Figure 13A:
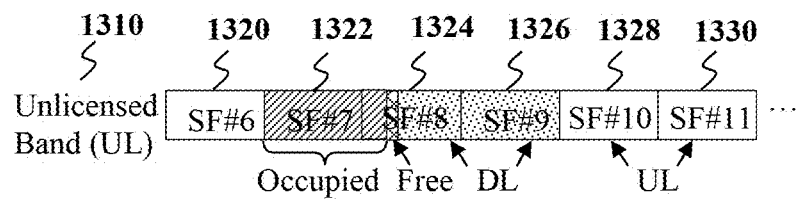
FIGS. 13A and 13B illustrate a process for an eNB to reserve an unlicensed carrier before a PUSCH transmission from a UE according to this disclosure.
Figure 13B:
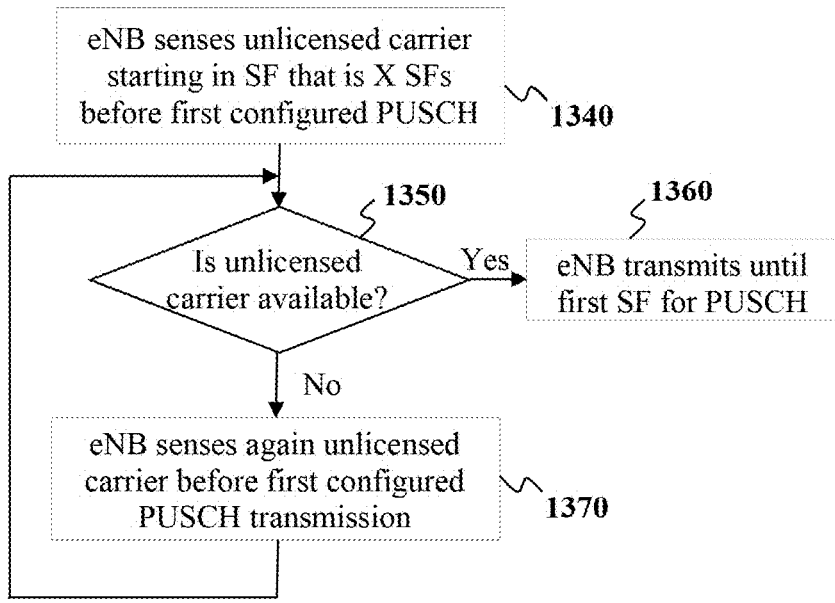

FIGS. 13A and 13B illustrate a process for an eNB 102 to reserve an unlicensed carrier before a PUSCH transmission from UE 114 according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processing circuitry and a transmitter chain in, for example, an eNB.

An eNB 102 configures PUSCH transmissions from UEs on an unlicensed carrier 1310 to begin in SF #10 1328 and continue in additional SFs such as SF #11 1330, and so on. The configuration of a PUSCH transmission to UE 114 can be through a transmission of a DCI format, or of a PHICH with a NACK value, or by RRC signaling (SPS PUSCH). The eNB 102 senses whether there are transmissions on the unlicensed carrier from non-served devices and in SF #7 1322 the eNB 102 detects a received energy above a threshold and does not transmit signaling. The eNB 102 senses whether there are transmissions on the unlicensed carrier from non-served devices and within SF #8 1324 the eNB 102 does not detect a received energy above the threshold and the eNB 102 transmits signaling, such as RS or PDSCH/PDCCH, in the remaining of SF #8 1324 and in SF #9 1326. The eNB 102 can suspend transmission in one or more last symbols of SF #9 1326 and switch to a receiving mode on the unlicensed carrier. One or more UEs, as configured by the eNB 102, can transmit SRS in the one or more last symbols of SF #9 1326, where SRS transmission from a first UE 114 can optionally be in different RBs than SRS transmission from a second UE, in order to substantially occupy the bandwidth of the unlicensed carrier (and also provide an estimate of the channel medium to the eNB 102). The operations for an eNB 102 to reserve an unlicensed carrier can be as follows. A number of X SFs before a first SF of configured PUSCH transmissions from respective UEs, an eNB 102 begins sensing an unlicensed carrier in operation 1340. When the eNB 102 determines that the unlicensed carrier is not used for transmissions from other devices in operation 1350, for example based on detected signal energy, the eNB 102 begins transmitting signaling such as RS or PDSCH/PDCCH in operation 1360. Alternatively, when the unlicensed carrier is unavailable in operation 1350, the eNB 102 can also suspend transmission and switch into a receiving mode on the unlicensed carrier prior to a first SF of configured PUSCH transmissions in operation 1370.

One approach for UEs to assist an eNB 102 in determining whether or not UE 114 transmits a PUSCH in a SF, while also mitigating the hidden node problem, is for UEs to reserve the unlicensed carrier and in doing so also provide information to the eNB 102 about whether or not the UEs are able to transmit in a SF. An eNB 102 can configure, for example by RRC signaling, a first group of UEs to transmit SRS in one or more last symbols of a SF, such as SF #9 1132, or in one or more first symbols of a SF such as SF #10 1135, with a configured periodicity. Other signals such as signals used in device-to-device (D2D) discovery or communication can also be used; some examples are physical D2D synchronization signal (PD2DSS) and D2D discovery signal. When UE 114 from the first group of UEs detects presence of another transmission prior to the configured SRS transmission, for example as described in REF 7, the UE 114 does not transmit the SRS. The eNB 102, based on the detected (or not detected) SRS transmission from each UE 114 in the first group of UEs, can determine whether UE 114 can transmit PUSCH in a first next SF, such as SF #10 1135. For example, the eNB 102 determines that the UE 114 can transmit in the first next SF when a respective SRS energy the eNB 102 receives is above a threshold set by the eNB 102. The UE 114 can be in the first group of UEs but can also not be in the first group of UEs as long as the UE 114 is in the vicinity of UE 114 in the first group of UEs as then a same carrier sensing outcome is likely. Similar, the eNB 102 can configure a second group of UEs to transmit SRS in one or more last symbols of the first next SF, such as SF #10 1135. The configuration for SRS transmission can also be in one or more first symbols of SF #11 1145. Based on the detected (or not detected) SRS transmission from the second group of UEs, the eNB 102 can determine whether UE 114 can transmit PUSCH in a second next SF, such as SF #11 1145, and so on.

When UE 114 obtains access to an unlicensed carrier during the first symbols of a SF, the UE 114 can transmit SRS in a few symbols of the SF and transmit a shortened PUSCH in the remaining symbols of the SF. For example, UE 114 that obtains access to an unlicensed carrier during a fourth symbol of a SF that includes 14 symbols, can transmit SRS until the seventh symbol of the SF (first slot) and transmit PUSCH in the remaining symbols of the SF, that is transmit a shortened PUSCH that spans only the second slot of the SF.

Figure 14:
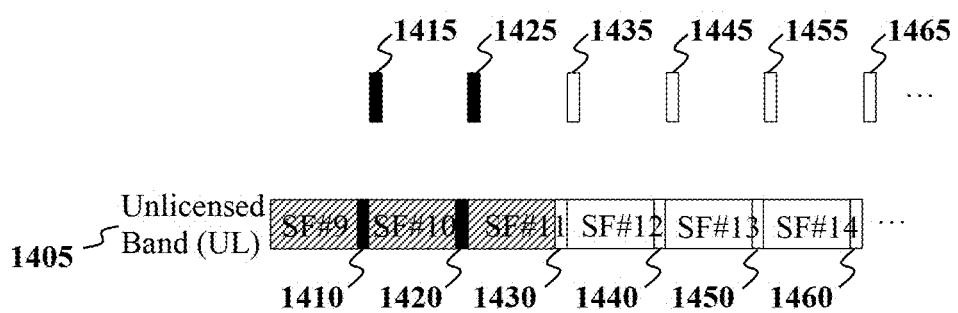
FIG. 14 illustrates a process for a group of UEs to transmit SRS or to suspend SRS transmission and for an eNB to determine an existence of a PUSCH transmission from a UE in a SF according to this disclosure.

FIG. 14 illustrates a process for a group of UEs to transmit SRS or to suspend SRS transmission and for an eNB 102 to determine an existence of a PUSCH transmission from UE 114 in a SF according to this disclosure. The embodiment of the process shown in FIG. 14 is for illustration only. Other embodiments could be used without departing from the scope of the present disclosure.

An eNB 102 configures SRS transmissions to UEs on an unlicensed carrier 1405. The eNB 102 configures a first group of UEs to transmit SRS in one or more last symbols of SF #9 1410. At least one UE 114 from the first group of UEs senses transmission from another device and suspends SRS transmission. The eNB 102 determines that the at least one UE 114 does not transmit SRS 1415. The eNB 102 configures a second group of UEs to transmit SRS in one or more last symbols SF #10 1420. At least one UE 114 from the second group of UEs senses transmission from another device and suspends SRS transmission. The eNB 102 determines that the at least one UE 114 from the second group of UEs does not transmit SRS 1425. The eNB 102 configures a third group of UEs to transmit SRS in one or more last symbols of SF #11 1430. Although other devices not served by the eNB 102 can be transmitting in at least a part of SF #11, the UEs in the third group of UEs sense that no such transmissions exist prior to transmitting SRS. The eNB 102 determines that all UEs from the third group of UEs transmit respective SRS 1435. The same process is repeated in subsequent SFs, 1440, 1450, and 1460 and the eNB 102 determines that UEs from respective groups of UEs transmit respective SRS 1445, 1455, and 1465. Depending on the instance within the SF where UE 114 determines the unlicensed carrier to be available, the UE 114 can transmit only SRS, for example if the instance is towards the end of the SF, or transmit both SRS over first remaining symbols of the SF and transmit a shortened PUSCH over remaining second symbols of the SF.

Another approach is for the eNB 102 to sense the unlicensed carrier prior to the SF of a configured PUSCH transmission and, when no signal transmission is detected, the eNB 102 can transmit signaling, such as RS or PDSCH/PDCCH, on the unlicensed carrier prior to the SF of the configured PUSCH transmission to reserve the unlicensed carrier. This method offers simplicity in reserving the unlicensed carrier but requires DL transmissions on the unlicensed carriers and is susceptible to the hidden node problem.

For a SF that includes $N_{symb}$ symbols, when the eNB 102 accesses the unlicensed carrier after $U_{symb}$ SF symbols from the beginning of a SF ($U_{symb}$ may not be an integer), the eNB 102 transmits various RS types (possibly also including PDSCH/PDCCH) over $Q_{symb}$ SF symbols ($Q_{symb}$ may not be an integer), the group of UEs can transmit SRS for remaining $R_{symb}$ SF symbols until the start of a next SF. For example, for a SF that includes $N_{symb}$=14 symbols, if the eNB 102 access the unlicensed carrier after $U_{symb}$=6.5 symbols from the beginning of a SF, the eNB 102 transmits various RS types for $Q_{symb}$=4.5 symbols of the SF, and one or more groups of UEs transmit SRS in $R_{symb}=N_{symb}-U_{symb}-Q_{symb}=3$ symbols of the SF. UE 114 can detect presence of DL signaling in less than $Q_{symb}$ SF symbols so that the UE 114 can be ready to transmit SRS (with preconfigured parameters) after $Q_{symb}$ SF symbols. In this manner, the first available SF can be used for UL transmissions from UEs. When $Q_{symb}$ is larger than a value, the UE 114 can transmit SRS in some of the first $Q_{symb}$ SF symbols and transmit a shortened PUSCH in the remaining $Q_{symb}$ SF symbols where the value can be predetermined in the system operation of signaled by a SIB or by UE-specific RRC signaling.

As UE 114 needs to sense an unlicensed carrier to determine whether a SF is available for a PUSCH or SRS transmission from the UE, it is necessary for the UE 114 to distinguish between transmissions on the unlicensed carrier that are from other UEs served by a same eNB 102 and transmissions on the unlicensed carrier that are from other devices not served by the eNB 102. In order for a first UE 114 to avoid confusing detection of a transmission from a second UE 114 served by the eNB 102 (that gained access to the unlicensed carrier before the first UE) with detection of a transmission from a device that is not served by the eNB 102, mechanisms need to be provided to enable UE 114 to identify between transmissions from other UEs served by the same eNB 102 and transmissions from other devices.

In one option, that considers that an eNB 102 reserved an unlicensed carrier, UEs can be restricted to attempt energy detection at predetermined time instances. Such time instances can be immediately prior to the beginning of a SF and can be configured by the eNB 102 so that respective resources do not include transmissions from UEs served by the eNB 102. One or more last symbols of a SF can serve for this purpose as UEs can suspend respective PUSCH transmissions, either to transmit SRS or to avoid interference from a SRS transmission that overlaps at least partially in bandwidth with the PUSCH transmission. Since a SF has duration of 1 msec and includes 14 symbols for normal CP or 12 symbols for extended CP, the symbol duration is at least 71.4 microseconds and it is several times larger than the SIFS duration that does not exceed 15-20 microseconds. A device using the distributed coordination function (DCF) needs to determine that an unlicensed carrier is continuously idle for DCF inter-frame space (DIFS) duration before being allowed to transmit. Similar to the SIFS, the DIFS in IEEE 802.11a/b/n is substantially smaller than the SF symbol duration.

When UE 114 detects an energy that is above a threshold, the UE 114 can determine that a device that is not served by a same eNB 102 transmits on the unlicensed carrier; otherwise, the UE 114 can determine that a device that is not served by the eNB 102 does not transmit on the unlicensed carrier. The threshold can be UE-specific and configured to the UE 114 by the eNB 102 through RRC signaling or can be predetermined in the system operation. This is primarily applicable in synchronous networks where transmissions across cells are aligned in time. In case that different operators use a same unlicensed carrier, co-ordination can be provided either by signaling or at deployment so that different operators assign different combs to UEs for SRS transmissions. Another dimension can be the SF where UEs are further instructed to avoid transmissions in certain frames, as defined by a SFN, or SFs as defined by a SF number within a frame. Moreover, to avoid any potential self-interference issues, UE 114 transmitting SRS does not simultaneously measure a received energy.

Figure 15A:
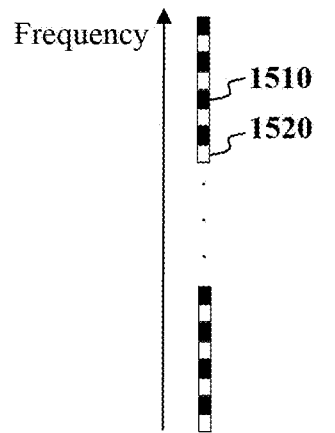
FIGS. 15A and 15B illustrate a process for UE 114 to classify transmissions on an unlicensed carrier according to this disclosure.
Figure 15B:
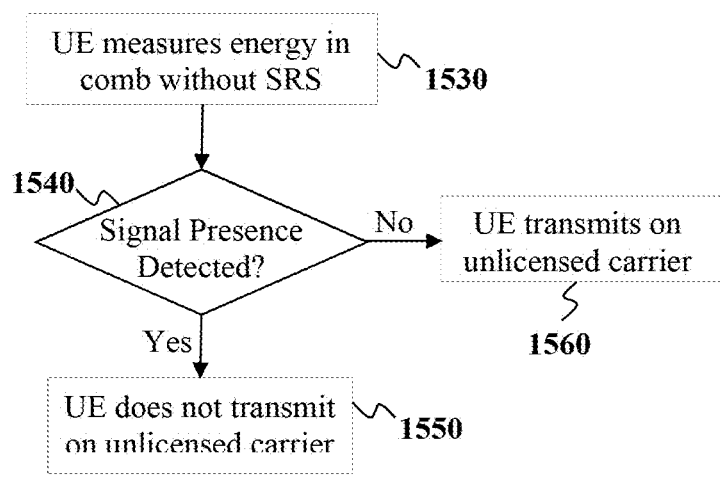

FIGS. 15A and 15B illustrate a process for UE 114 to classify transmissions on an unlicensed carrier according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processing circuitry and a transmitter chain in, for example, a UE.

An eNB 102 configures SRS transmissions to UEs on an unlicensed carrier. All SRS transmissions are configured to occur on a same comb 1510 leaving the other comb 1520 without any transmissions from UEs. UE 114 measures a received energy in comb in operation 1530 and determines whether or not the measurement value is above a threshold in operation 1540. When it is, the UE 114 does not transmit on the unlicensed carrier (in case the UE 114 has a configured transmission in the next SF) in operation 1550. When it is not, the UE 114 transmits on the unlicensed carrier a configured transmission in the next SF 1560. The eNB 102 can also apply the same functionalities regarding determination of a SRS transmission to determine whether UE 114 transmits a configured PUSCH in a SF. SRS transmissions can also be modified to occur per larger number of REs, such as per four REs, instead of per two REs thereby allowing for a larger number of combs, such as four combs, instead of two combs.

In order to minimize a number of SRS transmissions from UE 114 but maintain a flexibility of transmitting SRS as needed, for example for an eNB 102 to determine whether an unlicensed carrier is used for transmissions from devices not served by the eNB 102 (when the eNB 102 does not receive SRS as described in FIG. 14) or to enable UE 114 served by the eNB 102 to transmit on the unlicensed carrier while preventing a device not served by the eNB 102 to transmit in the unlicensed carrier, as described in FIG. 15, the eNB 102 may not configure periodic SRS transmissions from UE 114 on the unlicensed carrier and instead trigger aperiodic SRS transmissions by physical layer signaling of a DCI format to the UE 114. Triggering can include an SRS-only transmission from UE 114 without an associated PUSCH transmission. For example, SRS triggering can be as described in REF 2 and REF 3 but a code-point in a respective DCI format can be used to inform the UE 114 to transmit only SRS without transmitting a PUSCH or receiving a PDSCH. For example, for a DCI format scheduling a PUSCH, the code-point can be an invalid value of the resource allocation IE or a reserved value for a cyclic shift and OCC index field. Alternatively, a value of the RA IE can be defined to correspond to a zero RB allocation for a PUSCH transmission or for a PDSCH transmission. The SRS transmission can occur in a last symbol of a SF determined relative to a SF of the transmission of the DCI format triggering the SRS transmission or can occur as early as possible at any SF symbol and continue until the beginning of a SF determined relative to the SF of the transmission of the DCI format.

Figure 16:
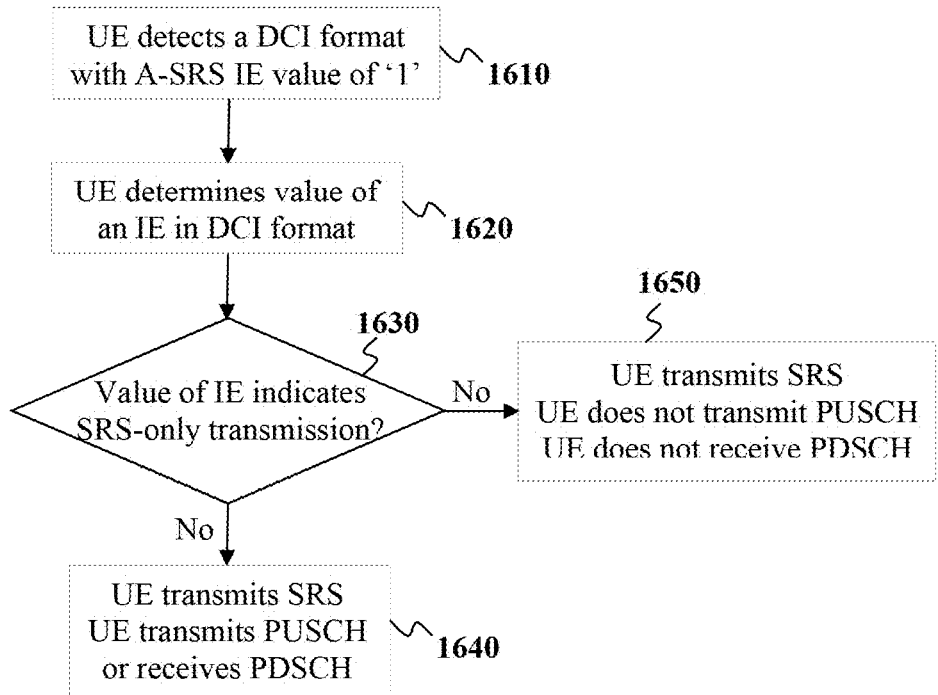
FIG. 16 illustrates a UE behavior in response to detecting a DCI format scheduling a PUSCH and triggering a SRS transmission according to this disclosure.

FIG. 16 illustrates UE 114 behavior in response to detecting a DCI format scheduling a PUSCH and triggering a SRS transmission according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processing circuitry and a transmitter chain in, for example, a UE.

UE 114 detects a DCI format triggering a SRS transmission (SRS request IE value is set to '1') in operation 1610. The UE 114 determines the value of an IE in the DCI format in operation 1620. The UE 114 examines whether the value of the IE triggers SRS transmission without an associated PUSCH transmission or PDSCH transmission in operation 1630. When it does not, the UE 114 transmits a PUSCH or receives a PDSCH using parameters derived from the detected DCI format in operation 1640. When it does, the UE 114 transmits only the SRS and does not transmit a PUSCH in operation 1650 or receive a PDSCH.

A bandwidth of an unlicensed carrier for UEs to perform sensing can be substantially a whole of the unlicensed carrier bandwidth (such as 90% of the unlicensed carrier) or a portion of the unlicensed carrier bandwidth. Using the whole of the unlicensed carrier bandwidth requires the eNB 102 to configure, for example through a SIB, the SF as an SRS transmission SF. The eNB 102 can indicate a SRS configuration with maximum SRS transmission bandwidth so that the SRS transmission substantially occupies the unlicensed carrier. Using a portion of the unlicensed carrier can allow SRS transmissions on one spectral comb while sensing can be performed on the other spectral comb that UE 114 can assume free of any transmissions (PUSCH or SRS) from UEs served by the eNB 102. In this manner, as described in FIG. 15, UE 114 served by an eNB 102 can sense that the unlicensed carrier is available when it is actually used for transmissions from other UEs served by the eNB 102 while devices using another radio access technology sense that the unlicensed carrier is occupied. The principle of UE 114 transmitting an UL signal with discontinuous spectrum occupancy to substantially occupy and reserve an unlicensed carrier can be directly extended to a PUSCH transmission.

UE 114 can further consider an unlicensed carrier to be available for a PUSCH transmission to an eNB 102 when the UE 114 detects transmissions from other devices but the bandwidth of the signal transmission does not include any of the PUSCH transmission bandwidth. For example, the other devices can be UEs transmitting to a different eNB 102 where transmissions to the different eNB 102 need not be synchronized with transmissions to the eNB 102. This can be further conditioned on a transmission power of the PUSCH being smaller than a transmission power threshold or on the PUSCH transmission bandwidth being separated by at least predetermined bandwidth threshold from the bandwidth where the UE 114 detects transmissions from other devices. In this case, the UE 114 needs to measure a received energy over each RB or blocks of RBs of the unlicensed carrier, at least for RBs where the UE 114 is configured a PUSCH transmission. The same concept can apply when the eNB 102 performs sensing for transmissions on the unlicensed carrier.

Figure 17A:
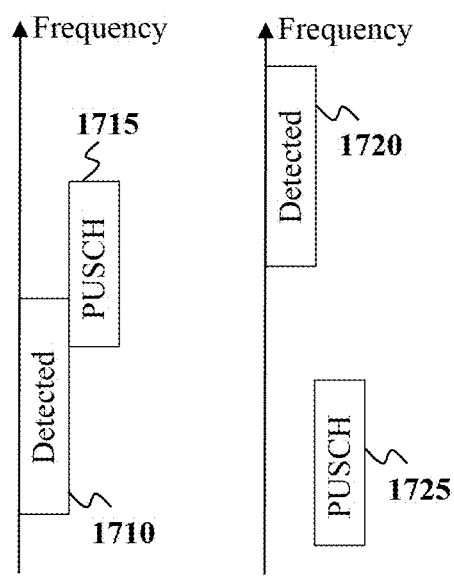
FIGS. 17A and 17B illustrate a PUSCH transmission by UE 114 depending on a bandwidth location of a signal transmission from another device according to this disclosure.
Figure 17B:
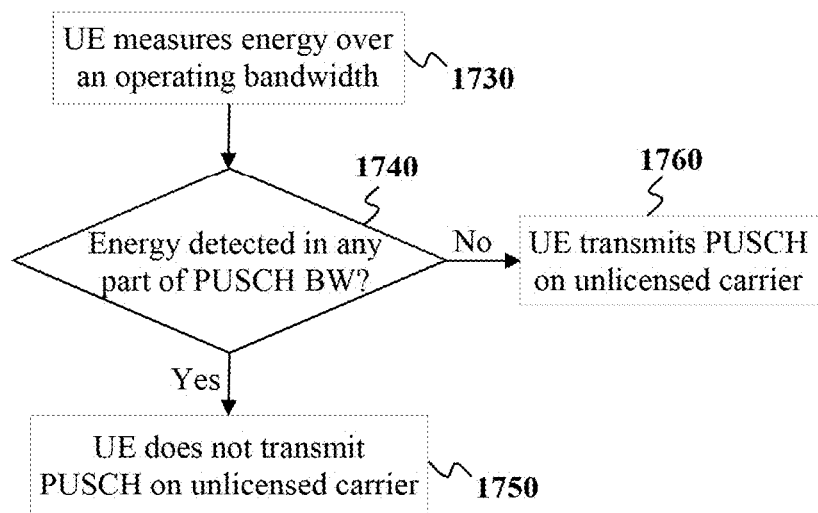

FIGS. 17A and 17B illustrate a PUSCH transmission by UE 114 depending on a bandwidth location of a signal transmission from another device according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processing circuitry and a transmitter chain in, for example, a UE.

In a first case and in a SF immediately before the SF of a configured PUSCH transmission, a first UE 114 detects a signal transmission from a device in a bandwidth 1710 that at least partially overlaps with the bandwidth of the configured PUSCH transmission 1715. In a second case and in a SF immediately before the SF of a configured PUSCH transmission, a second UE 114 detects a signal transmission from a device in a bandwidth 1720 that is different than the bandwidth of the configured PUSCH transmission 1725. To determine whether UE 114 can perform a configured PUSCH transmission in a SF, the UE 114 measures a received energy before the SF in operation 1730, for example based on a SRS transmission comb that is not used for SRS transmission as described in FIG. 15 or on RBs that are not used for PUSCH transmissions, if any. The UE 114 subsequently determines whether the measured energy is above a threshold in any part of the configured PUSCH transmission BW in operation 1740. This determination can be based on whether a measured energy over any RB or over a number of RBs for the configured PUSCH transmission exceeds a threshold. The threshold can be either predetermined in the system operation or configured to the UE 114 by the eNB 102, for example by RRC signaling. If the measured energy in any RB, or in any of the number of RBs, exceeds the threshold, the UE 114 does not transmit the PUSCH in operation 1750; otherwise, the UE 114 transmits the PUSCH in operation 1760.

An eNB 102 can also configure UE 114 to attempt PUSCH transmission in one of multiple bandwidths on an unlicensed carrier. This functionality can assist the UE 114 in transmitting a PUSCH in a configured SF even when a first configured bandwidth for the PUSCH transmission is not available. The first configured bandwidth for a PUSCH transmission is either indicated by a DCI format in case of an adaptive PUSCH transmission, or is a same bandwidth as for a PUSCH conveying an initial transmission of a data TB in case of a retransmission triggered by a NACK reception on a PHICH, or is an RRC configured bandwidth in case of SPS PUSCH. Additional opportunities for a PUSCH transmission can be configured in advance to UE 114 with respect to the first configured bandwidth. For an unlicensed carrier bandwidth that includes $M_{UC}$ RBs and for a PUSCH transmission that includes $m_{PUSCH}$ RBs, with $M_{PUSCH} < M_{UC}$, there can be a number of $N_{SF} = \lfloor M_{UC}/M_{PUSCH} \rfloor$ opportunities for PUSCH transmission bandwidths in a SF where $\lfloor \ \rfloor$ is the 'floor' function that rounds a number to its immediately lower integer. In order to limit the eNB 102 complexity from having to detect a PUSCH transmission from UE 114 in many bandwidths, a maximum number of $N_{attempts}$ candidate PUSCH transmission bandwidths, including the first configured bandwidth, can be configured for a PUSCH transmission in a SF. Then, a number of candidate PUSCH transmission bandwidths is $N_{candidate} = \min(N_{SF}, N_{attempts})$. The above analysis assumes that a wrap-around occurs in a PUSCH transmission BW when it reaches one end of a total bandwidth for an unlicensed carrier but such a wrap-around is not possible when PUSCH transmissions need to occur in a contiguous bandwidth. Denoting by $M_{UC,rem1}$ and $M_{UC,rem2}$ a remaining bandwidth on the unlicensed carrier towards a first end and a second end of the unlicensed carrier bandwidth, respectively, relative to the first configured PUSCH bandwidth, $N_{SF} = \lfloor M_{UC,rem1}/M_{PUSCH} \rfloor + \lfloor M_{UC,rem2}/M_{PUSCH} \rfloor$. Additionally, when an offset of $M_{offset}$ RBs is configured for candidate PUSCH transmission bandwidths, $N_{SF} = \lfloor M_{UC,rem1}/(M_{PUSCH}+M_{offset}) \rfloor + \lfloor M_{UC,rem2}/(M_{PUSCH}+M_{offset}) \rfloor$.

Figure 18A:
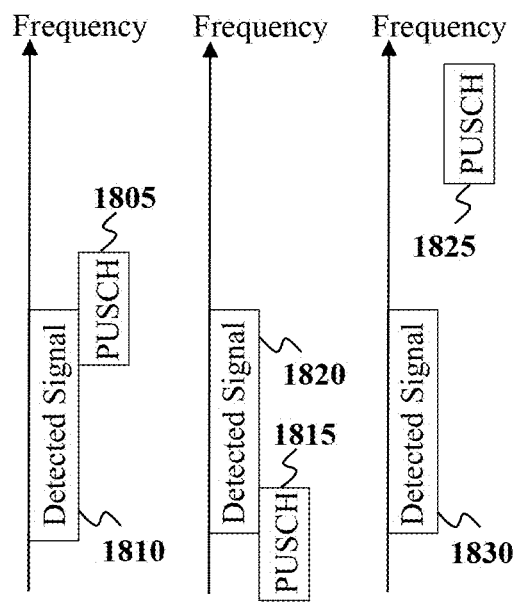
FIGS. 18A and 18B illustrate a PUSCH transmission by a UE in a bandwidth from a number of candidate bandwidths according to this disclosure.
Figure 18B:
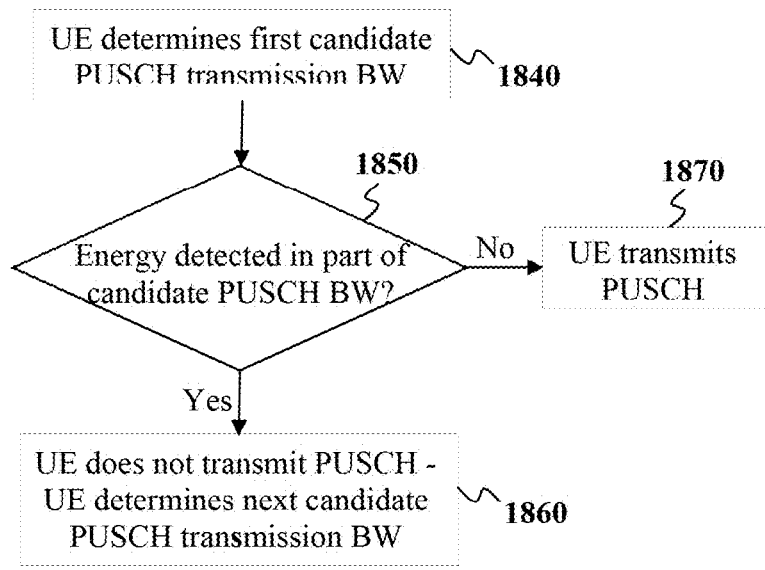

FIGS. 18A and 18B illustrate a PUSCH transmission by a UE in a bandwidth from a number of candidate bandwidths according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processing circuitry and a transmitter chain in, for example, a UE.

UE 114 has a first configured PUSCH transmission bandwidth 1805 in a SF (first candidate PUSCH transmission bandwidth). Immediately prior to the PUSCH transmission, the UE 114 senses that another transmission 1810 at least partially overlaps with the PUSCH transmission bandwidth and the UE 114 suspends the PUSCH transmission in the first configured bandwidth. The UE 114 also determines that a second candidate PUSCH transmission bandwidth 1815, that the UE 114 computes from the first configured PUSCH transmission bandwidth and a configured offset, at least partially overlaps with a bandwidth from another transmission 1820. Finally, the UE 114 determines that a third candidate PUSCH transmission bandwidth 1825, that the UE 114 computes from the first configured PUSCH transmission bandwidth and the configured offset, does not overlap with a bandwidth from another transmission 1830 and the UE 114 transmits the PUSCH in the third candidate bandwidth. For example, a transmission bandwidth control unit as in FIG. 24 can control a PUSCH transmission bandwidth. An eNB 102 receiver performs DTX detection for the PUSCH transmission from the UE 114 in each of the candidate bandwidths. Alternatively, the eNB 102 receiver attempts detection of a data TB conveyed by the PUSCH in each of the candidate bandwidths and examines a respective CRC check. The eNB 102 receiver can also sense transmission from another device prior to the PUSCH transmission from the UE 114 and limit the DTX detection or the attempted data TB detection in a few (including zero) candidate PUSCH transmission bandwidths.

The PUSCH transmission process is as follows. UE 114 first determines a first candidate PUSCH transmission bandwidth (can be the configured PUSCH transmission bandwidth) in operation 1840. The UE 114 measures a received energy immediately prior to the PUSCH SF and determines whether or not the measured energy in any part of the configured PUSCH transmission BW is above a threshold in operation 1850. The determination can be based on whether or not the detected energy over any RB or over a number of RBs for the configured PUSCH transmission exceeds the threshold. When the measured energy exceeds the threshold, the UE 114 does not transmit the PUSCH, determines a next candidate PUSCH transmission bandwidth in operation 1860 and repeats in operation 1850; otherwise, the UE 114 transmits the PUSCH in operation 1870.

Upon establishing availability of an unlicensed carrier, an eNB 102 can maintain its use by scheduling PUSCH transmissions in successive SF. The eNB 102 can release the unlicensed carrier for use from other devices by not transmitting and by not scheduling transmissions from UEs on the unlicensed carrier. As another device not served by the eNB 102 may not be able to access the unlicensed carrier when UEs served by the eNB 102 transmit continuously in time, the eNB 102 can inform the UEs to suspend periodic SRS transmissions, or any other periodic signaling such as periodic CSI transmissions in a PUCCH, on the unlicensed carrier by using UE-common control signaling through a PDCCH transmission on the licensed carrier. Equivalently, the eNB 102 can trigger UEs to start transmitting periodic signaling, such as SRS, by using UE-common control signaling through a PDCCH transmission on the licensed carrier. The eNB 102 can configure in advance through RRC signaling the SRS transmission parameters for each of the UEs. The UE-common control signaling can indicate the unlicensed carrier. The UE-common control signaling can additionally indicate a configuration of UL SFs on the unlicensed carrier for the triggered transmissions from the group of UEs.

Adaptive PUSCH transmission from UE 114 through a PDCCH conveying a DCI format from an eNB 102 can be used to avoid delays in PUSCH transmission due to an unlicensed carrier being used for transmissions from devices that are not served by the eNB 102. When the eNB 102 determines that it is preferable to not use an unlicensed carrier for a PUSCH transmission from the UE 114, for example when an application for an associated data TB requires low latency, or when the eNB 102 expects information from the UE 114 for maintaining the RRC connection or other important information such as MAC CEs (see also REF 4), or when the licensed carrier is underutilized in a respective SF and it is then preferable to have a better reliability for the PUSCH transmission, the DCI format can include an "Unlicensed Carrier Indication" IE indicating the carrier for the PUSCH transmission for a same HARQ process. The number of binary elements for the "Unlicensed Carrier Indication" IE can depend on a number of carriers that can be available to UE 114 for a PUSCH transmission for a same HARQ process. For example, when UE 114 can transmit a PUSCH either on a licensed carrier or on an unlicensed carrier, the "Unlicensed Carrier Indicator" IE can include one binary element. This is different than the functionality of a carrier indicator field in carrier aggregation that indicates a carrier for a PUSCH transmission where PUSCH transmissions in different carriers are associated with different HARQ processes. The "Unlicensed Carrier Indicator" IE indicates use of a licensed carrier or of an unlicensed carrier for a PUSCH transmission conveying a data TB for a same HARQ process. The same principle can apply for a PDSCH transmission to UE 114 when it can be either on a licensed carrier or on an unlicensed carrier.

Figure 19:
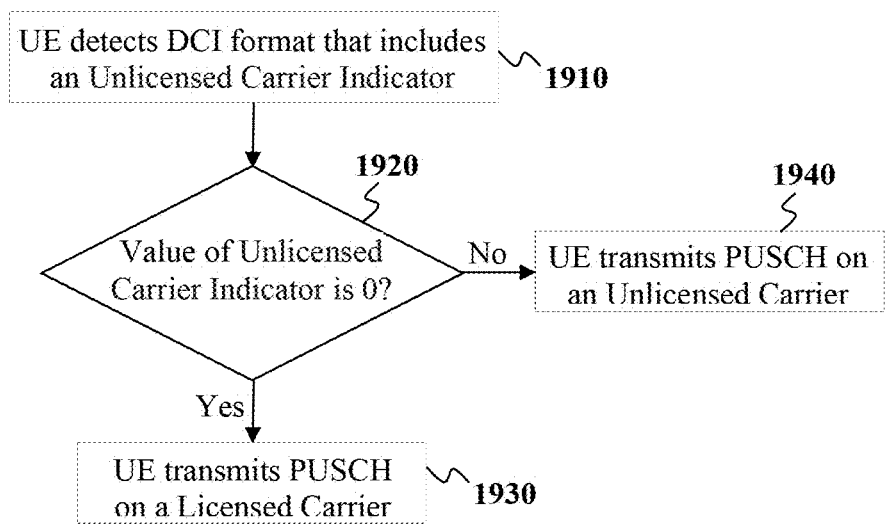
FIG. 19 illustrates a carrier selection for a transmission of a PUSCH based on a value of an "Unlicensed Carrier Indicator" IE in a DCI format scheduling the PUSCH transmission according to this disclosure.

FIG. 19 illustrates a carrier selection for a transmission of a PUSCH based on a value of an "Unlicensed Carrier Indicator" IE in a DCI format scheduling the PUSCH transmission according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processing circuitry and a transmitter chain in, for example, a UE.

UE 114 detects a DCI format scheduling a PUSCH transmission and including an "Unlicensed Carrier Indicator" IE in operation 1910. The UE 114 examines whether the value of the "Unlicensed Carrier Indicator" IE is 0 in operation 1920. When it is, the UE 114 transmits the PUSCH on a licensed carrier in operation 1930. When it is not, the UE 114 transmits the PUSCH on the unlicensed carrier in operation 1940. The reverse mapping can also apply (a value of 1 for the "Unlicensed Carrier Indicator" IE indicates PUSCH transmission on a licensed carrier). A same HARQ process is associated with the data TB conveyed by the PUSCH regardless of whether the PUSCH transmission is on a licensed carrier or on an unlicensed carrier.

An eNB 102 may not be able to detect a transmission from a non-served device while UE 114 served by the eNB 102 can detect the transmission from the non-served device (hidden node), for example when the device is located far from the eNB 102 and is located close to the UE 114 for the transmission of a PUSCH from the UE 114 to generate interference to the device. As the UE, and possibly other UEs in close proximity to the non-served device, can detect the presence of the non-served device, such UEs can provide this information to the eNB 102. This can be done through a transmission of a hidden node indicator (HNI) signal.

In a first approach, HNI signaling is similar to SR signaling (see also REF 1). A PUCCH resource on a licensed carrier is reserved for a group of one or more UEs (same PUCCH resource can be shared by multiple UEs). The PUCCH resource can include a SF, a RB, a code for transmission in the RB, and a periodicity. When one or more UEs determine existence of a hidden node, the one or more UEs transmit HNI signal in the configured PUCCH resource. The eNB 102 can detect a received energy in the PUCCH resource (due to transmissions from UEs in the group of UEs) and determine whether or not an active non-served device exists in the proximity of the group of UEs. The eNB 102 can configure, for example by RRC signaling, UE 114 to transmit a same signal as a positive SR in a PUCCH, and also configure a respective PUCCH resource, when the UE 114 detects a device transmitting in a SF of a scheduled PUSCH transmission.

In a second approach, the HNI signal can be a SRS and a group of one or more UEs can be configured with a resource (such as SFs, bandwidth, comb, cyclic shift, and ZC sequence) to transmit SRS on the licensed carrier to indicate existence of a hidden node. The eNB 102 receiver can apply a similar processing as for the first approach to determine whether one or more UEs from the group of UEs indicate existence of a hidden node.

In a third approach, when UE 114 does not transmit a configured PUSCH on an unlicensed carrier due to a hidden node, a HNI signal can be an acknowledgement-type signal that the UE 114 transmits on a PUCCH in the licensed carrier in a same manner as a HARQ-ACK signal in response to a PDCCH detection. For example, when the PDCCH scheduling the PUSCH transmission on the unlicensed carrier is transmitted from the licensed carrier, the UE 114 can transmit an acknowledgement signal on a PUCCH resource that is determined based on the CCE with the lowest index of the PDCCH (see REF 3); otherwise, the eNB 102 can configure to the UE 114 a PUCCH resource on the licensed carrier. When UE 114 can simultaneously transmit PUSCH on the unlicensed carrier and PUCCH on the licensed carrier, the UE 114 can transmit the HNI with an opposite bit value in a PUCCH on the licensed carrier to indicate PUSCH transmission on the unlicensed carrier. In this manner, the UE 114 can assist the eNB 102 to determine whether or not the UE 114 transmits PUSCH on the unlicensed carrier in case the eNB 102 does not perform or cannot perform accurate PUSCH DTX detection.

A determination by UE 114 of whether or not the UE 114 detects an interfering device or, in general, a determination by the UE 114 whether or not to transmit a HNI signal in a respective configured resource, can be based on whether or not a received energy (or power) that the UE 114 measures is above a threshold. The threshold can be configured to the UE 114 by the eNB 102, for example by higher layer signaling, or can be predetermined in the system operation. The resource can be same for a group of UEs, typically for UEs that are in close proximity. The SFs where UE 114 can measure received energy to detect a device that is not served by the eNB 102 can also be configured to the UE 114 by the eNB 102, for example by RRC signaling. Based on a received energy measurement in the HNI resource or on the HNI signal detection, the eNB 102 can determine whether or not UE 114 indicates a hidden node.

Figure 20:
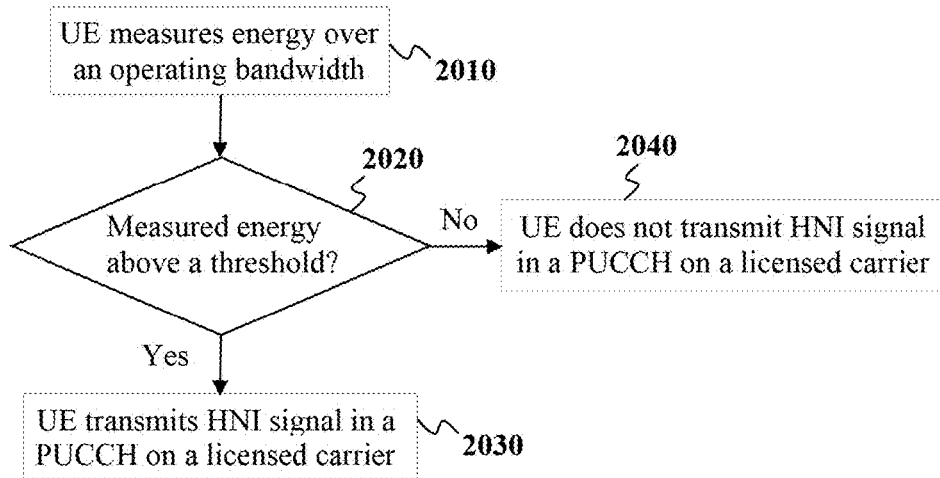
FIG. 20 illustrates a carrier selection for a transmission of a PUSCH based on a value of an "Unlicensed Carrier Indicator" IE in a DCI format scheduling the PUSCH transmission according to this disclosure.

FIG. 20 illustrates a transmission of a HNI signal from a UE 114 to an eNB 102 in a PUCCH resource in a SF depending on whether or not the UE 114 detects another device not served by the eNB 102 interfering with a PDSCH transmission to or a PUSCH transmission from the UE 114 according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processing circuitry and a transmitter chain in, for example, an eNB and by a processing circuitry and a transmitter chain in, for example, a UE.

UE 114 measures energy on an unlicensed carrier in operation 2010. The UE 114 considers whether or not the UE 114 detects a device that is not served by the eNB 102, as determined by the method used to measure the energy, or in general, whether or not the UE 114 detects an energy that is above a threshold in operation 2020. When it does, the UE 114 transmits a HNI signal in a configured PUCCH resource on a licensed carrier in operation 2030. When it does not, the UE 114 does not transmit a HNI in the configured PUCCH resource on the licensed carrier in operation 2040. The HNI signal can alternatively be a SRS.

Operation in Coverage Limited Environments

UEs can be in locations where signal transmissions to or from an eNB 102 experience a large path (propagation) loss. Such UE 114 can experience poor coverage and require CE as large as 15-20 deciBell (dB) for a desired reception reliability for at least one of the channels the UE 114 transmits or receives (the channel requiring the largest signal-to-interference and noise ratio (SINR) to achieve a desired reception reliability that is typically an UL channel). Using an unlicensed carrier with a lower carrier frequency for UL transmissions and a licensed carrier with a higher carrier frequency for DL transmissions can balance DL coverage and UL coverage, reduce UE 114 power consumption, and reduce a resource overhead associated with repetitions of a channel transmission in order to improve an effective SINR resulting after combining repetitions at a receiver.

For operation on an unlicensed carrier, a predetermined time instance for a transmission of a channel or signal from UE 114 to an eNB 102 cannot be ensured as the unlicensed carrier can be used for transmissions from other devices that are not served by the eNB 102. When an unlicensed carrier is used for communication, repetitions for a transmission cannot be ensured to occur at a predetermined SF.

In one approach, for a same CE target, an eNB 102 can configure UE 114 a somewhat larger number of repetitions for the PUSCH transmission when the UE 114 transmits on an unlicensed carrier than when the UE 114 transmits on a licensed carrier in order to account for the probability that the unlicensed carrier is not be available in some of the SFs that the eNB 102 considers to be used for repetitions of the PUSCH transmission. The first approach is applicable at least when the eNB 102 cannot reliably detect transmissions from an interfering device on the unlicensed carrier (hidden node).

Due to the low SINR experienced at an eNB 102 for each repetition of a PUSCH transmission from UE 114, the eNB 102 cannot typically accurately determine whether or not UE 114 actually transmits a PUSCH repetition as a reception power at the eNB 102 for each repetition can be much smaller than the noise power. Then, in case the UE 114 does not actually transmit a repetition, for example due to the UE 114 performing carrier sensing (LBT) and determining that another device transmits, the eNB 102 can receive noise in the frequency resources and the SF of the repetition.

In a second approach, when an eNB 102 can identify transmissions from an interfering device through a respective LBT of a CCA process, the eNB 102 can avoid combining a received signal for a repetition from the UE 114 in respective frequency resources and SFs.

To account for suspended repetitions of a PUSCH transmission from UE 114 due to LBT (and for a SINR degradation that occurs from accumulating noise when an eNB 102 and UE 114 do not have a same identification of interfering devices), the eNB 102 can increase a total number of configured repetitions, for a DL channel transmission or for an UL channel transmission. For example, the eNB 102 can assume that the UE 114 transmits at least 80% of the repetitions for a PUSCH transmission and for a total of $N_1$ repetitions, the SINR degradation from suspended repetitions of the PUSCH transmission in $0.2 \times N_1$ SFs is X dB. When the eNB 102 has a same identification of interfering devices as the UE, that is when the eNB 102 has same LBT outcomes as the UE, the eNB 102 can configure the UE 114 with a total of $N_2 > N_1$ repetitions where $N_2$ is such that it provides a SINR gain of X dB over $N_1$. The smaller the percentage of repetitions that UE 114 can transmit, the larger the value of $N_2$. When the eNB 102 cannot have a same identification of interfering devices as the UE, the eNB 102 can configure a value of $N_2$ that provides a SINR gain larger than X dB in order to account both for suspended repetitions by the UE 114 and for noise reception by the eNB 102 in SFs where the UE 114 suspends respective repetitions but the eNB 102 receiver assumes their presence.

Figure 21:
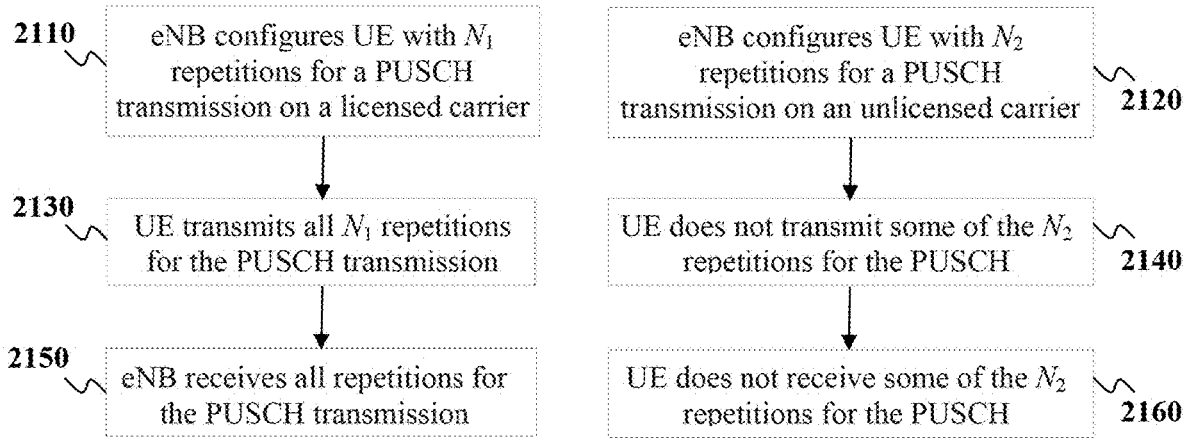
FIG. 21 illustrates an assignment for a number of repetitions of a PUSCH transmission depending on whether the PUSCH is transmitted on a licensed carrier or on an unlicensed carrier according to this disclosure.

FIG. 21 illustrates an assignment for a number of repetitions of a PUSCH transmission depending on whether the PUSCH is transmitted on a licensed carrier or on an unlicensed carrier according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processing circuitry and a transmitter chain in, for example, an eNB and by a processing circuitry and a transmitter chain in, for example, a UE.

UE 114 requiring a same CE (after adjusting for propagation loss due to different carrier frequencies) and transmitting a PUSCH on a licensed carrier or on an unlicensed carrier, is configured by an eNB 102 a first number of $N_1$ repetitions on the licensed carrier in operation 2110 and a second number of $N_2$ repetitions on the unlicensed carrier in operation 2120 where $N_2 > N_1$. The UE 114 transmits all $N_1$ repetitions on the licensed carrier in operation 2130. In SFs where the UE 114 determines an interfering device on the unlicensed carrier, the UE 114 suspends respective repetitions on the unlicensed carrier in operation 2140. The eNB 102 accumulates all repetitions for a PUSCH transmission on the licensed carrier in operation 2150. In SFs where the eNB 102 determines an interfering device on the unlicensed carrier, the eNB 102 suspends reception of respective repetitions on the unlicensed carrier in operation 2160. Although FIG. 21 considers repetitions of a PUSCH transmission, the same principles are applicable for the transmission of any DL channel or UL channel.

An additional event resulting from UE 114 operating under coverage limiting conditions and experiencing a large path loss to an eNB 102 is that the UE 114 may not be able to detect transmissions of signals from or to other devices (carrier sensing always indicates that the unlicensed carrier is available). This is because, similar to signaling from the eNB 102, signaling to/from another device is significantly attenuated when it is received by the UE 114. The reverse also applies; other devices may not be able to detect that the UE 114 is transmitting. This event is not problem for other devices as the interference generated by the UE 114 is low enough (as it cannot be detected) and does not meaningfully degrade a reception reliability of signals transmitted or received by the other devices. However, even through the UE 114 considers all SFs available for repetitions of a PUSCH transmission, as the UE 114 cannot detect transmissions from other devices, this event can be problematic as, unlike operation on a licensed carrier, some repetitions are likely to experience interference from transmission from or to other devices. When the eNB 102 cannot identify the interfering device, reception reliability is affected as some repetitions are received (by the eNB 102 or by the UE) with dominant interference. When the eNB 102 can identify the interfering devices, the main issue is the additional UE 114 power consumption as the UE 114 transmits repetitions that experience interference and the eNB 102 can avoid receiving. Similar to the case when due to a carrier sensing outcome UE 114 is not be able to transmit all repetitions of a PUSCH transmission, the eNB 102 can account for this event by assigning to the UE 114 a larger number of repetitions for a PUSCH transmission than when the repetitions of the PUSCH transmission occur on a licensed carrier. The eNB 102 can determine a number of repetitions considering, for example, statistics for strong interference detection across SFs in the bandwidth used for repetitions of a PUSCH transmission from the UE 114 on the unlicensed carrier. As such statistics can vary with time, for example as interference is more likely during certain hours of the day, the eNB 102 can reconfigure in time the number of repetitions for a PUSCH transmission. The eNB 102 can avoid combining repetitions of a PUSCH transmission in SFs where the eNB 102 observes strong interference (a high received signal energy) thereby creating a number of effective repetitions that is smaller than the number of actual repetitions from the UE 114 and similar to a number of repetitions the eNB 102 assigns to the UE 114 for repetitions on a licensed carrier for a same CE.

Instead of relying on a larger number of repetitions for a PUSCH transmission from UE 114 to circumvent interference from other devices in some SFs and in at least part of the bandwidth where the UE 114 transmits the repetitions of the PUSCH transmission on an unlicensed carrier, the eNB 102 can prevent such interference from occurring. The eNB 102 can transmit signaling, such as a RS or PDSCH/PDCCH, in SFs where UEs transmit repetitions of respective PUSCHs and in RBs of the unlicensed carrier that are different than the RBs used for the repetitions of the PUSCH transmission. As the eNB 102 needs to simultaneously transmit and receive, respective RBs can have sufficient separation to avoid interference of transmitted signals to received signals at the eNB 102. An eNB 102 can select a power and RBs for the signal transmission so that interference to transmissions from UEs is sufficiently reduced and maximum transmission power constraints associated with transmissions on the unlicensed carrier are not exceeded. For example, for an unlicensed carrier with 20 MHz bandwidth, when PUSCH transmissions are configured to occur in the first 15 MHz, the eNB 102 can transmit the RS in the last 3 MHz. For example, RBs conveying transmissions for UEs and the eNB 102 can be interleaved where, in an ascending order of RBs, the eNB 102 transmits in first RBs, one or more UEs transmit in second RBs, the eNB 102 transmits in third RBs, one or more UEs transmit in fourth RBs, and so on. A device that is not served by the eNB 102 can then detect the energy of the DL signaling and refrain from transmitting on the unlicensed carrier in respective SFs.

Figure 22A:
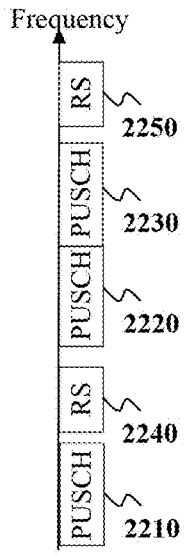
FIGS. 22A and 22B illustrate an eNB transmitting DL signaling in SFs where one or more UEs transmit repetitions of respective PUSCHs and in RBs that are different than the RBs for the repetitions of the PUSCH transmissions according to this disclosure.
Figure 22B:
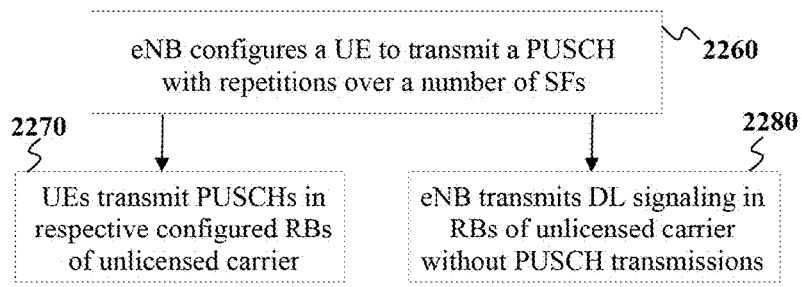

FIGS. 22A and 22B illustrates an eNB 102 transmitting DL signaling in SFs where one or more UEs transmit repetitions of respective PUSCHs and in RBs that are different than the RBs for the repetitions of the PUSCH transmissions according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processing circuitry and a transmitter chain in, for example, an eNB and by a processing circuitry and a transmitter chain in, for example, a UE.

UEs transmit PUSCHs in RBs 2210, 2220 and 2230 of an unlicensed carrier. An eNB 102 transmits signals in RBs 2240 and 2250. The eNB 102 configures each UE 114 to transmit PUSCH with repetitions over a number of SFs in operation 2260. Each UE 114 transmits a PUSCH in respective configured one or more RBs in operation 2270. The eNB 102 also transmits DL signals in some of the RBs of the unlicensed carrier that are not used by UEs to transmit repetitions of respective PUSCHs in operation 2280.

Figure 23:
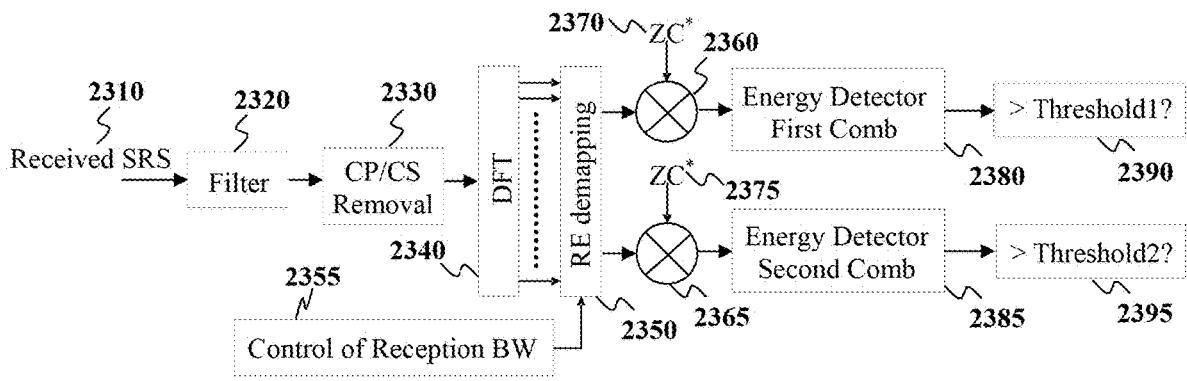
FIG. 23 illustrates a UE receiver or an eNB receiver for receiving a SRS and for determining a received SRS energy according to this disclosure.

FIG. 23 illustrates UE 114 receiver or an eNB 102 receiver for receiving a SRS and for determining a received SRS energy according to this disclosure. The embodiment of the UE 114 receiver or the eNB 102 receiver shown in FIG. 23 is for illustration only. Other embodiments could be used without departing from the scope of the present disclosure.

UE 114 or an eNB 102 receives a SRS 2310, and after filtering 2320 and removal of a CP and of a cyclic shift 2330

(by separate units), the signal is provided to a DFT filter 2340. The REs of the SRS transmission bandwidth 2350 are selected by reception bandwidth control unit 2355. Multipliers 2360 and 2365 multiply, element-by-element, the selected REs with a complex conjugate of a ZC sequence 2370 and 2375, respectively, used to transmit the SRS on a first comb and on a second comb. A first energy detector determines a received energy over a first SRS transmission comb 2380 and a second energy detector determines a received energy over a second SRS transmission comb 2385. The first and the second energy detectors can be a same unit. A first threshold comparator determines whether the received energy over the first SRS transmission comb is larger than a first threshold 2390 and a second threshold comparator determines whether a received energy over the second SRS transmission comb is larger than a second threshold 2395. The first and the second threshold comparators can be a same unit. The first threshold and the second threshold can have a same value.

Figure 24:
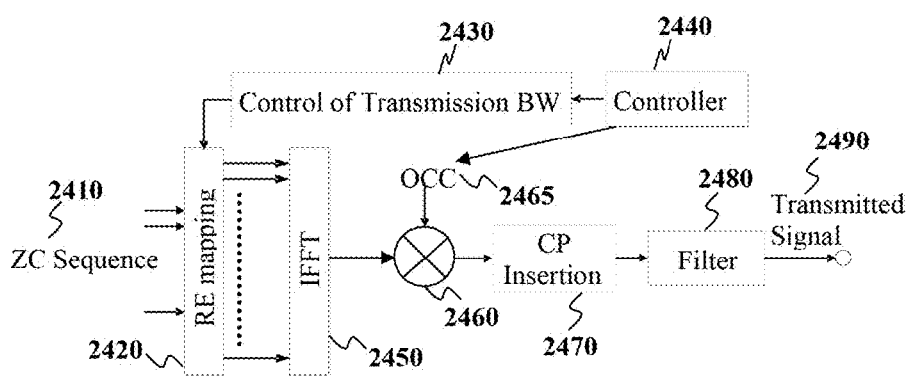
FIG. 24 illustrates a UE transmitter for transmitting a signal indicating either a suspended PUSCH transmission or a SR according to this disclosure.

FIG. 24 illustrates UE 114 transmitter for transmitting a signal indicating either a suspended PUSCH transmission or a SR according to this disclosure. The embodiment of the UE 114 transmitter shown in FIG. 24 is for illustration only. Other embodiments could be used without departing from the scope of the present disclosure.

A ZC sequence (in the frequency domain) 2410 is mapped to a transmission bandwidth 2420 indicated by a transmission bandwidth control unit 2430. The transmission bandwidth can be 1 RB and be selected by a controller 2440 based on a first configured RB and on a second configured RB depending on whether or not the transmission is to indicate a SR or an inability to transmit a PUSCH. The first RB and the second RB can be same. Subsequently, unit 2450 applies an IFFT and multiplier 2460 multiplies the output symbol with an OCC 2465 that is indicated by controller 2440 depending on whether the transmission is to indicate a SR or an inability to transmit a PUSCH. The output is then provided to a CP insertion unit 2470, a filter 2480, and a RF transmitter 2490.

Figure 25:
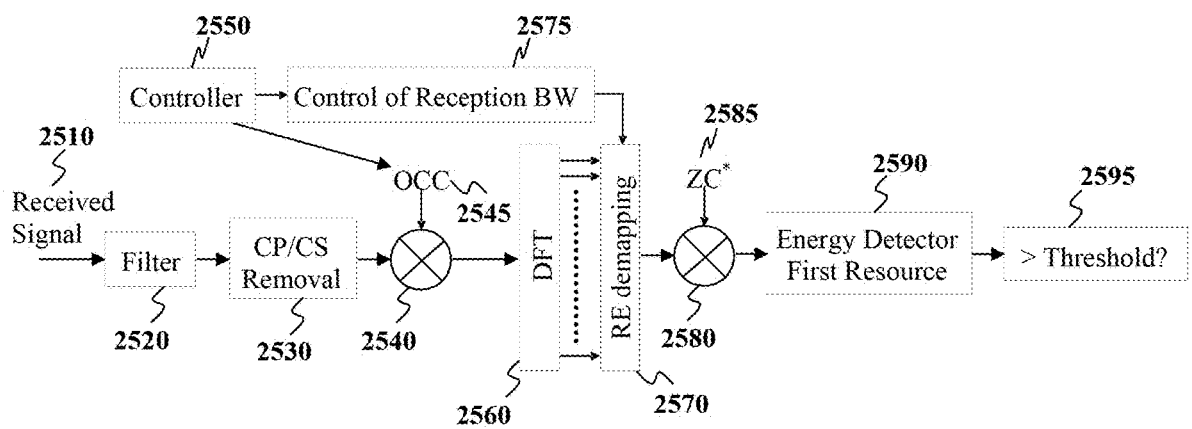
FIG. 25 illustrates an eNB receiver for receiving a signal indicating either a suspended PUSCH transmission or a SR according to this disclosure.

FIG. 25 illustrates an eNB 102 receiver for receiving a signal indicating either a suspended PUSCH transmission or a SR according to this disclosure. The embodiment of the eNB 102 receiver shown in FIG. 25 is for illustration only. Other embodiments could be used without departing from the scope of the present disclosure.

An eNB 102 receives a signal 2510, and after filtering 2520 and removal of a CP and of a cyclic shift 2530 (by separate units), the signal is multiplied by multiplier 2540 with an OCC 2545 indicated by controller 2550. The multiplication result is provided to a DFT unit 2560 and a reception BW control unit 2575 controls a RE de-mapping unit 2570 to select REs indicated by controller 2550. Multiplier 2580 multiplies, element-by-element, the selected REs with a complex conjugate of a ZC sequence 2585 used to transmit the received signal. An energy detector 2590 determines a first received energy over a first OCC and RB resource indicated by controller 2550. A threshold comparator determines whether the received energy is larger than a first threshold 2595. All steps except for steps 2510, 2520, and 2530 are repeated for a second OCC and RB resource indicated by controller 2550 and a threshold comparator determines whether a second received energy is larger than a second threshold 2595. The first threshold and the second threshold can have a same value. If the first energy is larger than the first threshold, the eNB 102 can determine that UE 114 indicates an interferer. If the second energy is larger than the second threshold, the eNB 102 can determine that the UE 114 indicates a scheduling request. If both the first energy is larger than the first threshold and the second energy is larger than the second threshold, the eNB 102 can determine that either the UE 114 indicates an interferer or the UE 114 indicates a scheduling request, for example depending on a predetermined likelihood probability.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with example embodiments, various changes and modifications may be suggested to one skilled in the art. It is intended that the present disclosure encompass such changes and modifications that fall within the scope of the appended claims.

What is claimed is:

1. A method for a user equipment (UE) to perform a random access procedure, the method comprising:
    receiving, at the UE, a system information block (SIB) on a downlink (DL) carrier, wherein the SIB includes configuration information for a first uplink (UL) carrier and a second UL carrier; and
    transmitting, by the UE, a physical random access channel (PRACH) on either the first UL carrier or the second UL carrier,
    wherein a frequency band of the DL carrier is same as a frequency band of the first UL carrier and is different than a frequency band of the second UL carrier, and
    wherein the frequency band of the second UL carrier is lower than the frequency band of the first UL carrier.

2. The method of claim 1, further comprising:
    receiving, by the UE, a random access response (RAR) message on the DL carrier that schedules a transmission of a data channel; and
    transmitting, by the UE, the data channel,
    wherein, after the random access procedure, the UE transmits on one of the first UL carrier and the second UL carrier.

3. The method of claim 1, wherein the SIB includes configuration information for determining a power for the PRACH transmission on the first UL carrier and for determining a power for the PRACH transmission on the second UL carrier.

4. The method of claim 1, further comprising:
    receiving a downlink control information (DCI) format, wherein the DCI format schedules a transmission of a physical uplink shared channel (PUSCH), and wherein the DCI format includes a carrier indicator field that has one binary element with a value indicating either the first UL carrier or the second UL carrier; and
    transmitting the PUSCH only on one of the first UL carrier or the second UL carrier at a given time based on the value.

5. The method of claim 4, wherein a carrier indicator field value of zero corresponds to the first UL carrier and a carrier indicator field value of one corresponds to the second UL carrier.

6. The method of claim 4, wherein the carrier indicator field is included only in a DCI format that schedules a PUSCH transmission and is not included in a DCI format that schedules a reception of a physical downlink shared channel (PDSCH).

7. A user equipment (UE), comprising:
processing circuitry; and
a transceiver communicably coupled to the processing circuitry, the transceiver configured to:
receive a system information block (SIB) on a downlink (DL) carrier, wherein the SIB includes configuration information for a first uplink (UL) carrier and for a second UL carrier, and
transmit a physical random access channel (PRACH) on either the first UL carrier or the second UL carrier,
wherein a frequency band of the DL carrier is same as a frequency band of the first UL carrier and is different than a frequency band of the second UL carrier, and
wherein the frequency band of the second UL carrier is lower than the frequency band of the first UL carrier.

8. The UE of claim 7, wherein the transceiver is further configured to:
receive a random access response (RAR) message on the DL carrier that schedules a transmission of a data channel, and
transmit the data channel,
wherein, after a random access procedure, the transceiver is configured to transmit on one of the first UL carrier and the second UL carrier.

9. The UE of claim 7, wherein the SIB includes configuration information for determining a power for the PRACH transmission on the first UL carrier and for determining a power for the PRACH transmission on the second UL carrier.

10. The UE of claim 7, wherein the transceiver is further configured to:
receive a downlink control information (DCI) format, wherein the DCI format schedules a transmission of a physical uplink shared channel (PUSCH), and wherein the DCI format includes a carrier indicator field that has one binary element with a value indicating only one of the first UL carrier or the second UL carrier, and
transmit the PUSCH either on the first UL carrier or on the second UL carrier based on the value.

11. The UE of claim 10, wherein a carrier indicator field value of zero corresponds to the first UL carrier and a carrier indicator field value of one corresponds to the second UL carrier.

12. The UE of claim 10, wherein the carrier indicator field is included only in a DCI format that schedules a PUSCH transmission and is not included in a DCI format that schedules a reception of a physical downlink shared channel (PUSCH).

13. A base station apparatus, comprising:
processing circuitry; and
a transceiver communicably coupled to the processing circuitry, the transceiver configured to:
transmit a system information block (SIB) on a downlink (DL) carrier, wherein the SIB includes configuration information for a first uplink (UL) carrier and for a second UL carrier, and
receive a physical random access channel (PRACH) on either the first UL carrier or the second UL carrier,
wherein a frequency band of the DL carrier is same as a frequency band of the first UL carrier and is different than a frequency band of the second UL carrier, and
wherein the frequency band of the second UL carrier is lower than the frequency band of the first UL carrier.

14. The base station of claim 13, wherein the transceiver is further configured to:
transmit, on the DL carrier, a random access response (RAR) message that schedules a reception of a data channel on the same UL carrier as the PRACH reception, and
receive the data channel,
wherein, after a random access procedure, the transceiver is configured to receive only on one of the first UL carrier and the second UL carrier.

15. The base station of claim 13, wherein the SIB includes configuration information for determining a PRACH transmission power on the first UL carrier and for determining a PRACH transmission on the second UL carrier.

16. The base station of claim 13, wherein the transceiver is further configured to:
transmit a downlink control information (DCI) format, wherein the DCI format schedules a reception of a physical uplink shared channel (PUSCH), and wherein the DCI format includes a carrier indicator field that has one binary element with a value indicating only one of the first UL carrier or the second UL carrier, and
receive the PUSCH either on the first UL carrier or on the second UL carrier based on the value.

17. The base station of claim 16, wherein a carrier indicator field value of zero corresponds to the first UL carrier and a carrier indicator field value of one corresponds to the second UL carrier.

* * * * *